(12) United States Patent
Obu et al.

(10) Patent No.: US 7,692,871 B2
(45) Date of Patent: Apr. 6, 2010

(54) ZOOM LENS DEVICE AND IMAGE PICKUP APPARATUS INCLUDING THE SAME

(75) Inventors: Kenji Obu, Utsunomiya (JP); Ken Wada, Shioya-gun (JP); Kenji Shinohara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 12/186,371

(22) Filed: Aug. 5, 2008

(65) Prior Publication Data

US 2009/0040604 A1 Feb. 12, 2009

(30) Foreign Application Priority Data

Aug. 6, 2007 (JP) .............................. 2007-203964

(51) Int. Cl.
*G02B 15/14* (2006.01)
(52) U.S. Cl. ...................................... 359/687; 359/685
(58) Field of Classification Search ................. 359/684, 359/685, 686, 687
See application file for complete search history.

(56) References Cited

U.S. PATENT DOCUMENTS 7,057,818 B2   6/2006 Hamano
7,193,790 B2   3/2007 Hamano
2009/0310228 A1*  12/2009 Shinohara ................... 359/687
2009/0323198 A1*  12/2009 Kusaka ....................... 359/687

FOREIGN PATENT DOCUMENTS

| JP | 08-050244 | 2/1996 |
| JP | 2003-295059 | 10/2003 |
| JP | 2004-199000 | 7/2004 |
| JP | 2006-113453 | 4/2006 |
| JP | 2006-285019 | 10/2006 |
| JP | 2007-003554 | 1/2007 |

* cited by examiner

*Primary Examiner*—David N Spector
(74) *Attorney, Agent, or Firm*—Canon USA Inc IP Div

(57) ABSTRACT

A zoom lens device includes, from an object side to an image side, a first lens unit having a positive refractive power, a second lens unit having a negative refractive power, a third lens unit having a positive refractive power, and a fourth lens unit having a positive refractive power. The zoom lens device is formed so that a distance Ximg between a position of the first lens unit at the wide-angle end and a position of the first lens unit that is maximally moved towards the image side, a distance Xobj between the position of the first lens unit at the wide-angle end and a position of the first lens unit that is maximally moved towards the object side, and a focal length fw of the zoom lens device at the wide-angle end are suitable values.

10 Claims, 22 Drawing Sheets

ZOOM LENS DEVICE AND IMAGE PICKUP APPARATUS INCLUDING THE SAME

BACKGROUND OF THE INVENTION

1. Field of the Invention

The present invention relates to a zoom lens device and an image pickup apparatus including the same. The zoom lens device and the image pickup apparatus are suitable for use in, for example, a video camera, an electronic still camera, a broadcasting camera, or a silver halide photographic camera.

2. Description of the Related Art

In recent years, an image pickup apparatus, such as a camera using a silver-halide film, a broadcasting camera, a digital still camera, or a video camera using a solid-state image pickup element, is becoming a highly functional apparatus, and the entire image pickup apparatus is being reduced in size. Accordingly, a zoom lens device, serving as an image taking optical system and used in the image pickup apparatus, is required to have a short overall length, to be compact, and to have a high resolution.

Further, the zoom lens device is required to have a wide field angle and a high zoom ratio.

A known zoom lens device meeting such requirements includes, from an object side to an image side, four lenses in the following order. They are a first lens unit having a positive refractive power, a second lens unit having a negative refractive power, a third lens unit having a positive refractive power, and a fourth lens unit having a positive refractive power.

A zoom lens device including five lens units is also known. The five lens units are, from the object side to the image side, a first lens unit having a positive refractive power, a second lens unit having a negative refractive power, a third lens unit having a positive refractive power, a fourth lens unit having a positive refractive power, and a fifth lens unit having a positive or a negative refractive power.

A rear-focusing type zoom lens device including four lens units is known. In the zoom lens device, a first lens unit, a second lens unit, and a third lens unit perform zooming, and a fourth lens unit corrects an image plane variation, resulting from the zooming, and performs focusing. (Refer to U.S. Pat. No. 7,057,818, U.S. Pat. No. 7,193,790, and Japanese Patent Laid-Open Nos. 08-050244, 2004-199000, and 2006-113453.)

A zoom lens device including five lens units and whose fifth lens unit has a positive refractive power is known. In the zoom lens device, during zooming, first to fourth lens units are moved to set a high zoom ratio. (Refer to Japanese Patent Laid-Open No. 2007-003554.)

In general, to reduce the size of the entire zoom lens device, the number of lenses is reduced while increasing the refractive power of each lens unit of the zoom lens device.

However, in such a zoom lens device, a lens wall thickness is increased due to an increase in the refractive power of each surface. When a contraction effect of a lens system is not sufficient, it becomes difficult to correct various aberrations at the same time.

In the aforementioned zoom lens device including four lens units and zoom lens device including five lens units, for obtaining good optical performance while reducing the size of an entire lens system and achieving a high zoom ratio, it is important to properly set, for example, the refractive power of each lens unit, a lens structure, and movement conditions resulting from zooming of each lens unit.

In particular, for reducing an effective diameter of the first lens unit (front lens unit) while achieving a high zoom ratio, it becomes important to move the first lens unit during zooming, and to properly set the movement conditions of the first lens unit resulting from the zooming at this time.

In addition, it becomes important to properly set the refractive powers of the first and second lens units and an imaging magnification resulting from zooming.

When these structural factors are not properly set, it becomes very difficult to obtain a high optical performance within an entire zooming range while maintaining a high zoom lens device ratio.

SUMMARY OF THE INVENTION

The present invention provides a zoom lens device including, from an object side to an image side, a first lens unit having a positive refractive power, a second lens unit having a negative refractive power, a third lens unit having a positive refractive power, and a fourth lens unit having a positive refractive power. Zooming is performed by changing distances between the lens units (preferably, by changing all distances between the neighboring lens units). The first lens unit is moved towards the object side after being moved towards the image side during zooming from a wide-angle end to a telephoto end, so that the first lens unit is positioned closer to the object side at the telephoto end than at the wide-angle end. In the zoom lens device, the following conditions are satisfied:

$$0.1 < Ximg/fw < 2.5, \text{ and}$$

$$4.80 < Xobj/fw < 15.00$$

where a distance between a position of the first lens unit at the wide-angle end and a position of the first lens unit that is maximally moved towards the image side is Ximg, a distance between the position of the first lens unit at the wide-angle end and a position of the first lens unit that is maximally moved towards the object side is Xobj, and a focal length of the zoom lens device at the wide-angle end is fw.

Further features of the present invention will become apparent from the following description of exemplary embodiments with reference to the attached drawings.

DESCRIPTION OF THE EMBODIMENTS

An embodiment of the present invention provides a small zoom lens device that has a small front lens diameter and a high zoom ratio, and that provides a high optical performance over an entire zooming range. Another embodiment of the present invention provides an image pickup apparatus using the zoom lens device.

Embodiments of the zoom lens device and the image pickup apparatus using the zoom lens device will hereunder be described.

A zoom lens device according to the present invention includes, from an object side to an image side, a first lens unit having a positive refractive power, a second lens unit having a negative refractive power, a third lens unit having a positive refractive power, and a fourth lens unit having a positive refractive power. When zooming, the distances between the lens units (that is, the distance between the first and second lens units, the distance between the second and third lens units, and the distance between the third and fourth lens units) are changed (i.e., all distances between the neighboring lens units are changed). Although, in the embodiment, the first to fourth lens units are all moved when zooming, the present invention is not limited thereto. For example, the first, second, and third lens units may only be moved, or the second, third, and fourth lens units may only be moved. In addition, in the embodiment, when the zoom lens device includes a fifth lens unit, the fifth lens unit is not moved for zooming.

When the first lens unit is moved from a wide-angle end to a telephoto end during zooming, after the first lens unit is moved towards the image side, the first lens unit is positioned closer to the object side at the telephoto end than at the wide-angle end. That is, when zooming from the wide-angle end to the telephoto end, the first lens unit moves towards the image side along a convex locus, so that the first lens unit is positioned closer to the object side at the telephoto end than at the wide-angle end.

Figure 1:
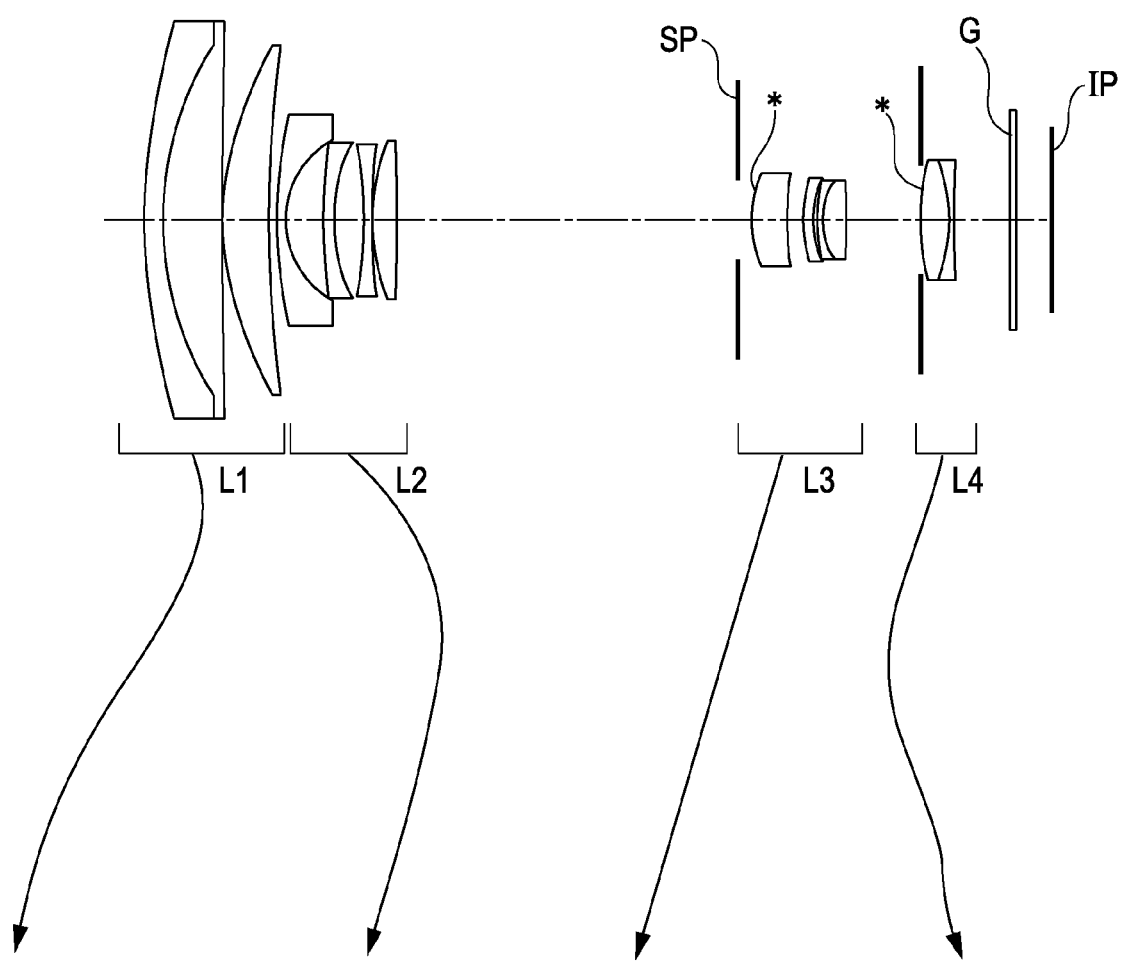
FIG. 1 is a sectional view of lenses at a wide-angle end according to Numerical Example 1 of the present invention, and shows a zoom locus.
Figure 2:
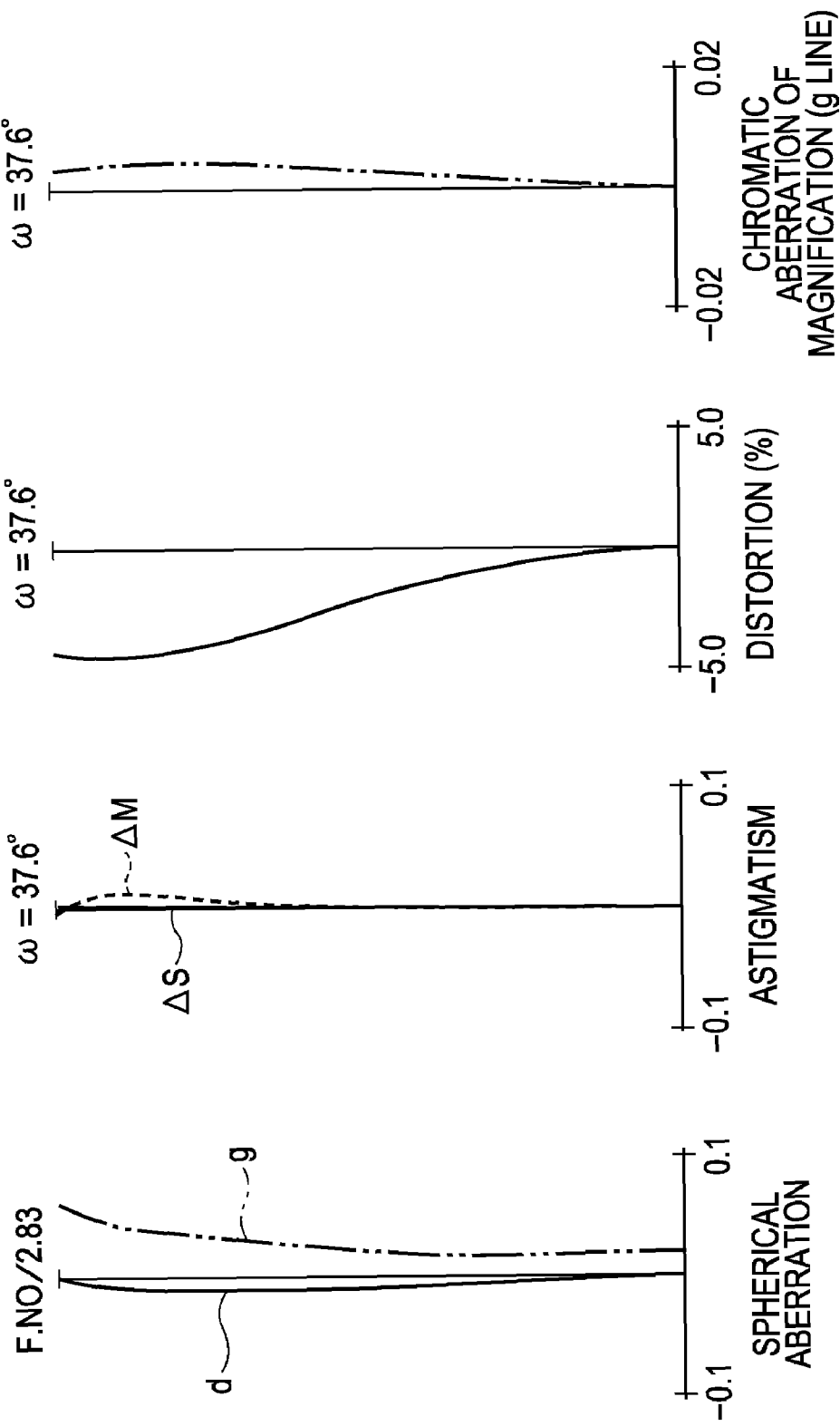
FIG. 2 illustrates aberrations at the wide-angle end according to Numerical Example 1 of the present invention.
Figure 3:
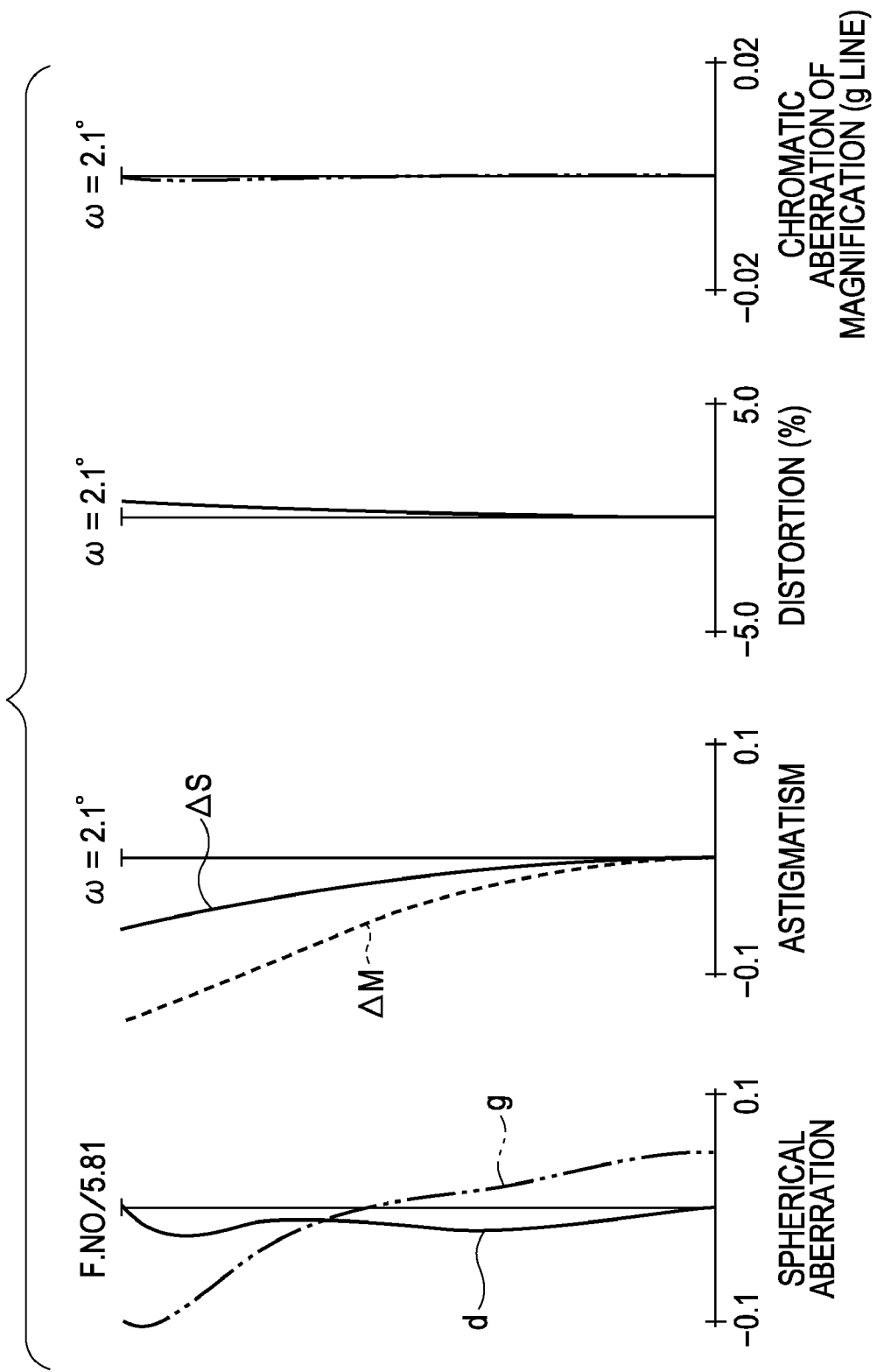
FIG. 3 illustrates aberrations at a telephoto end according to Numerical Example 1 of the present invention.

FIG. 1 is a sectional view of lenses at the wide-angle end (a short focal length) of a zoom lens device according to a first embodiment of the present invention. FIGS. 2 and 3 illustrate aberrations at the wide-angle end and at the telephoto end (a long focal length) of the zoom lens device according to the first embodiment, respectively.

Figure 4:
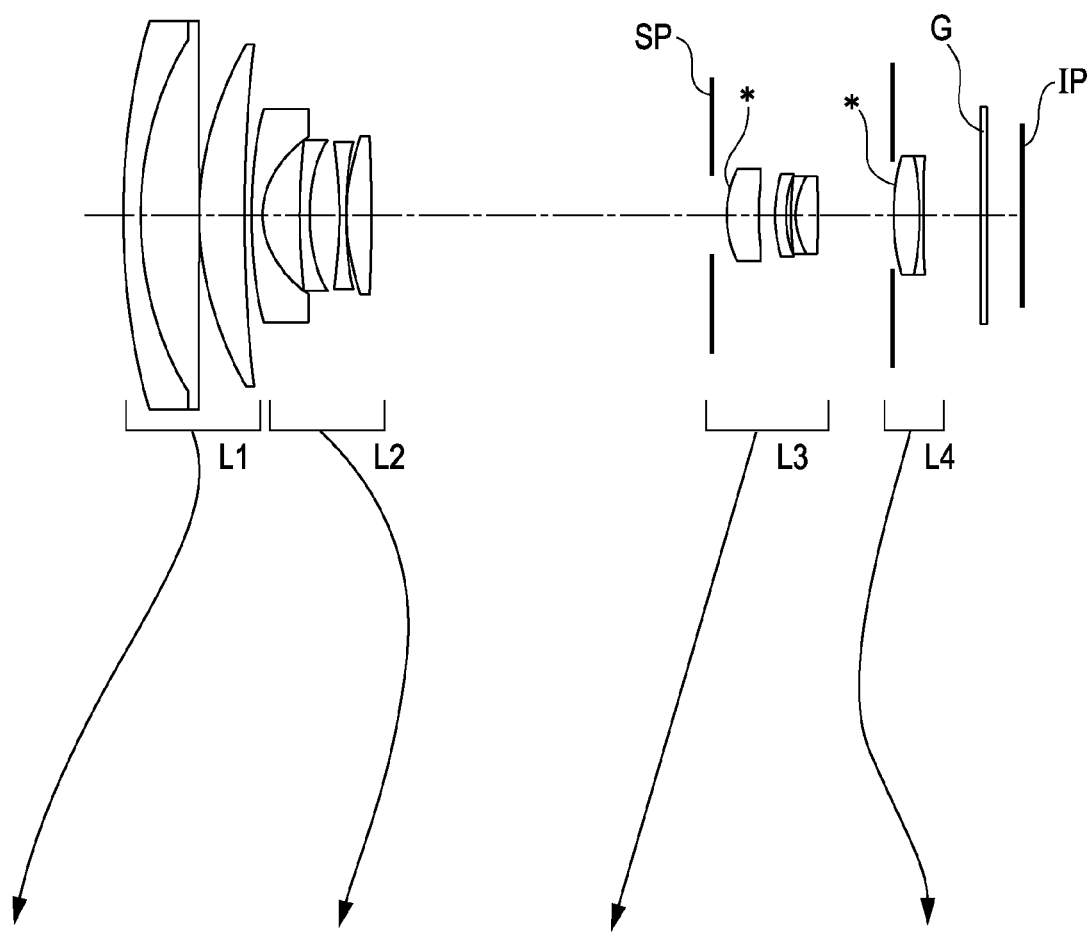
FIG. 4 is a sectional view of lenses at a wide-angle end according to Numerical Example 2 of the present invention, and shows a zoom locus.
Figure 5:
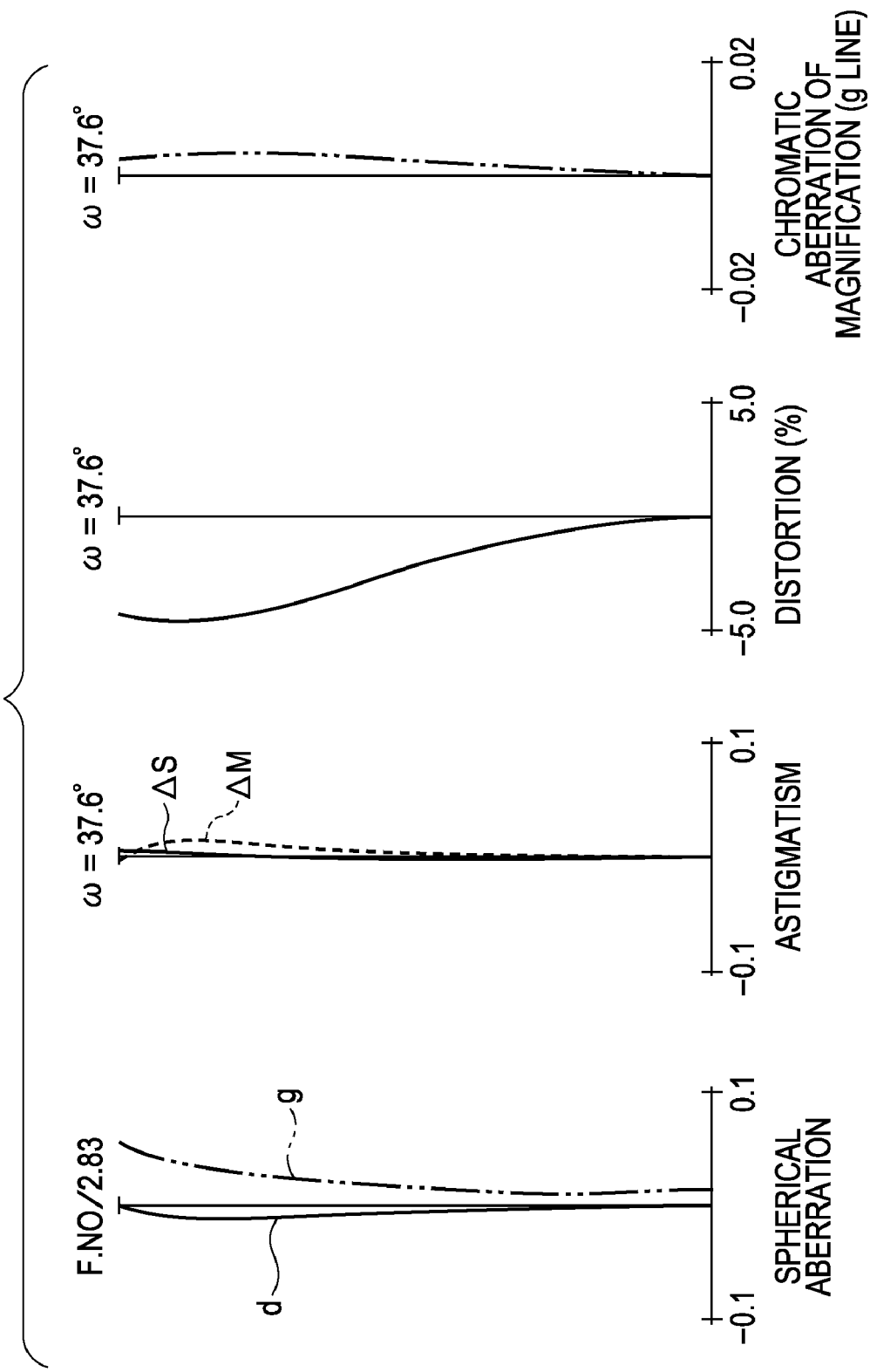
FIG. 5 illustrates aberrations at the wide-angle end according to Numerical Example 2 of the present invention.
Figure 6:
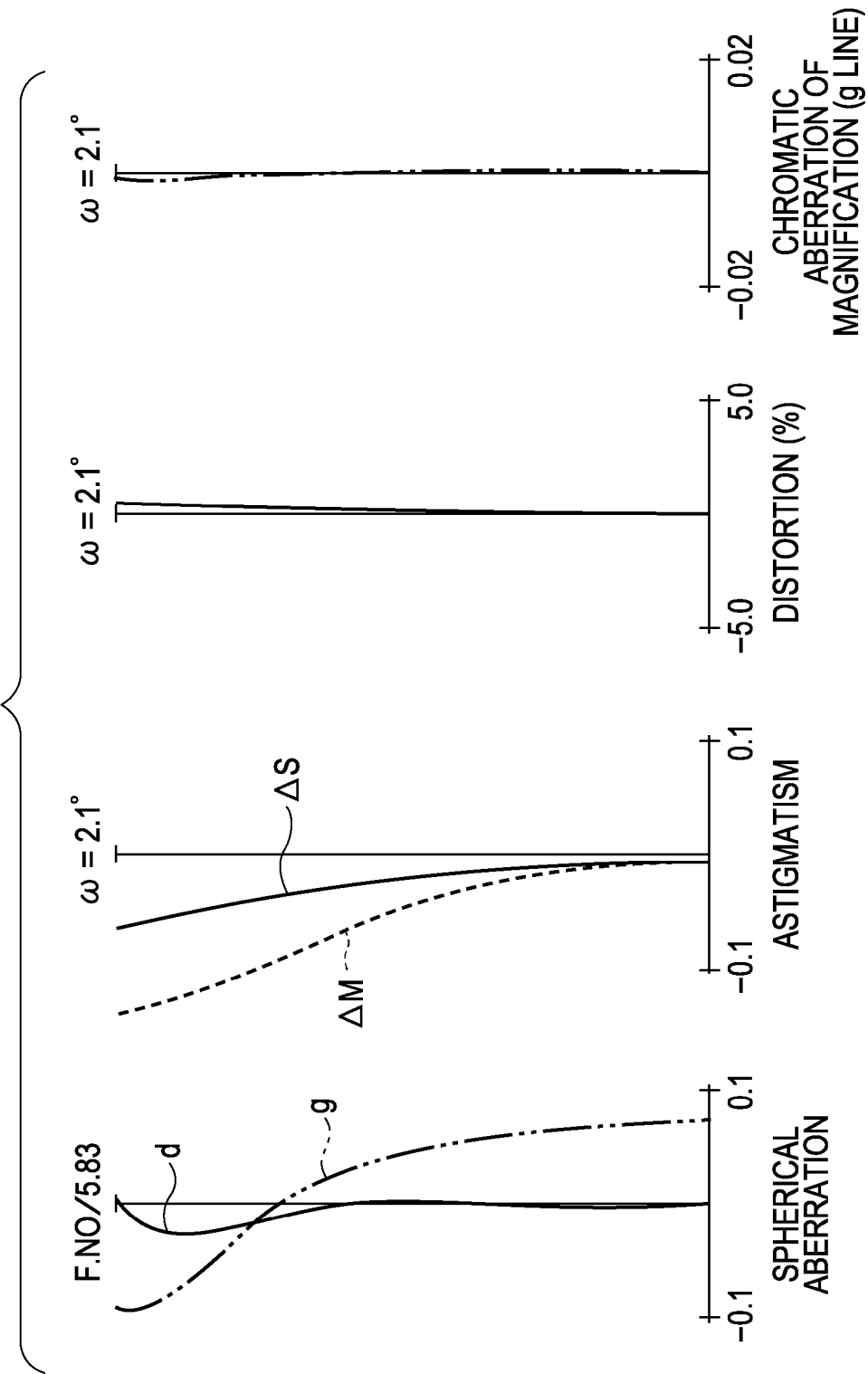
FIG. 6 illustrates aberrations at a telephoto end according to Numerical Example 2 of the present invention.

FIG. 4 is a sectional view of lenses at the wide-angle end of a zoom lens device according to a second embodiment of the present invention. FIGS. 5 and 6 illustrate aberrations at the wide-angle end and at the telephoto end of the zoom lens device according to the second embodiment, respectively.

Figure 7:
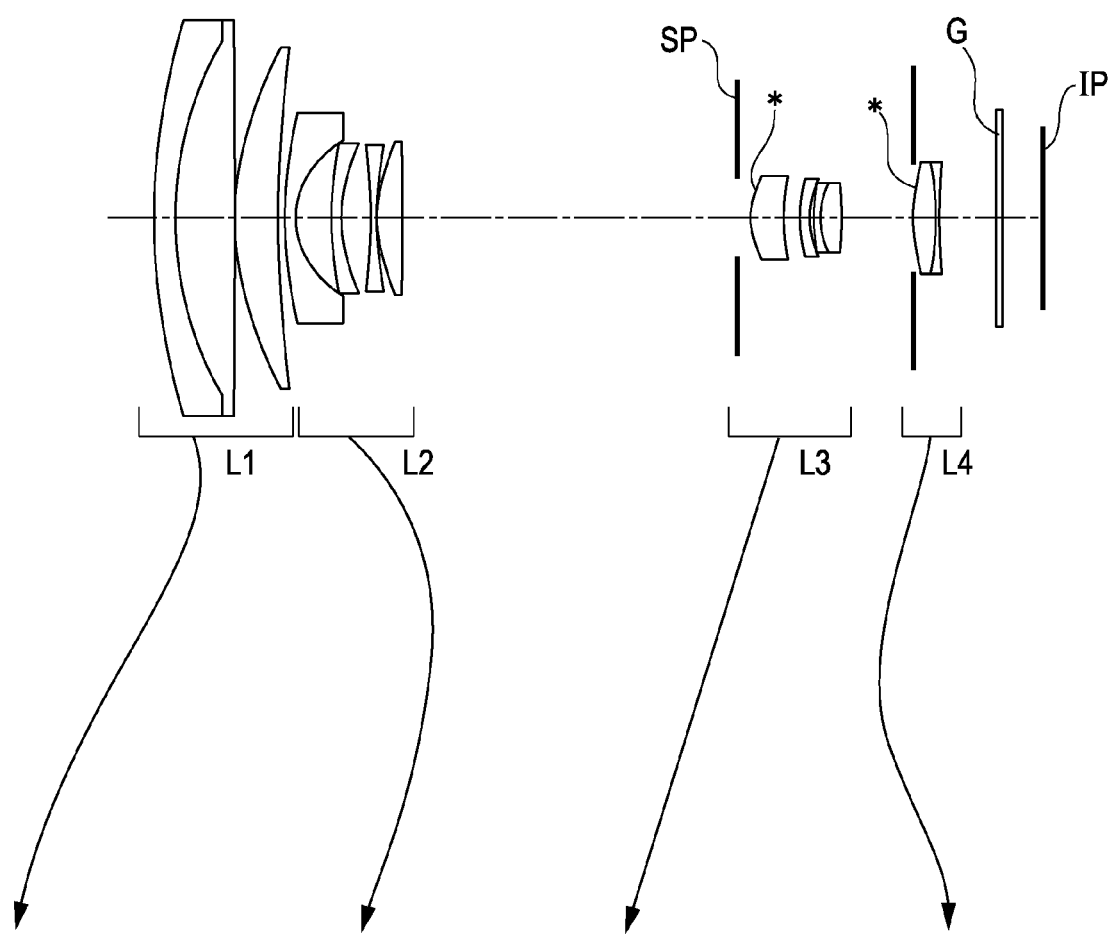
FIG. 7 is a sectional view of lenses at a wide-angle end according to Numerical Example 3 of the present invention, and shows a zoom locus.
Figure 8:
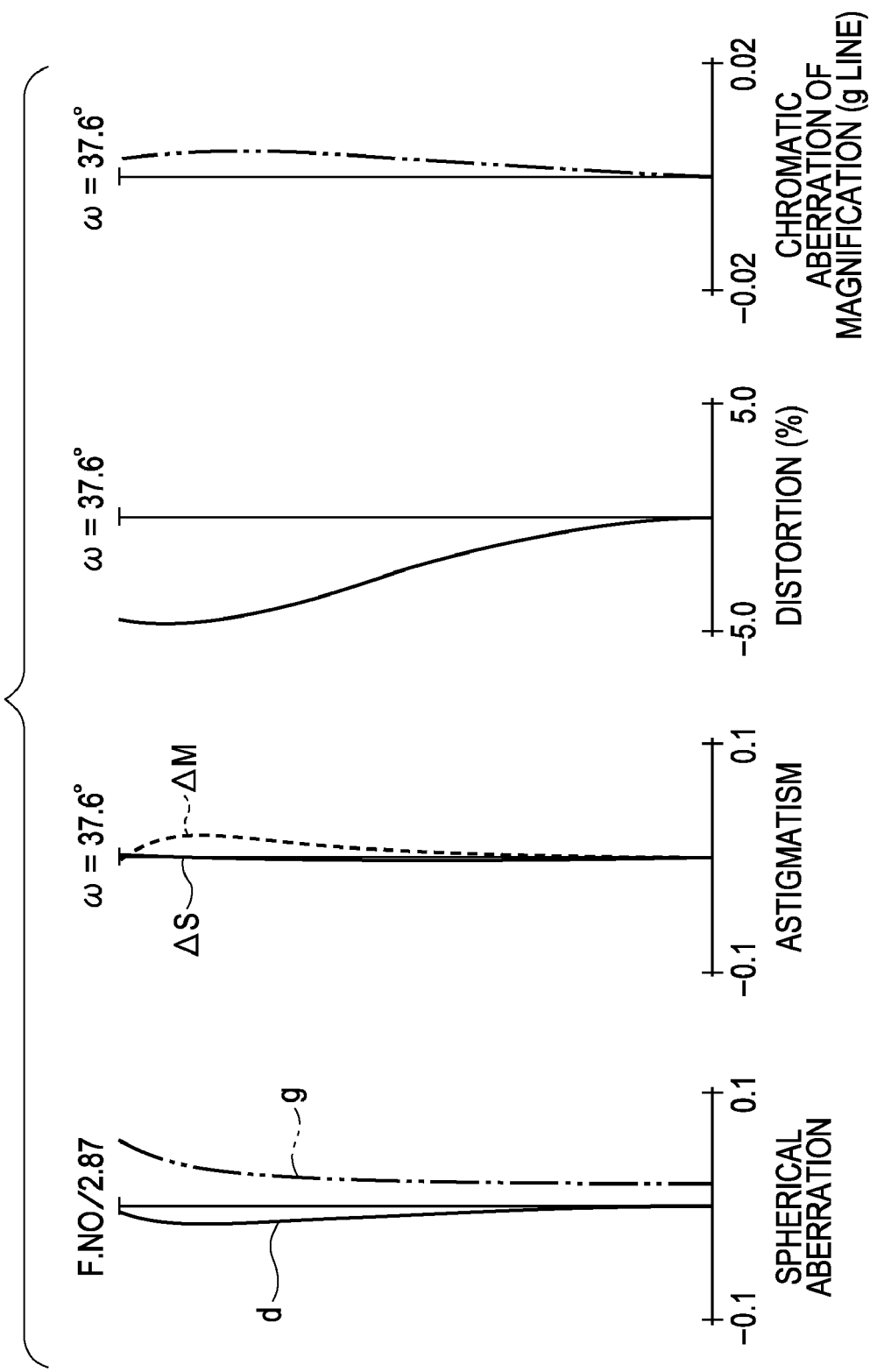
FIG. 8 illustrates aberrations at the wide-angle end according to Numerical Example 3 of the present invention.
Figure 9:
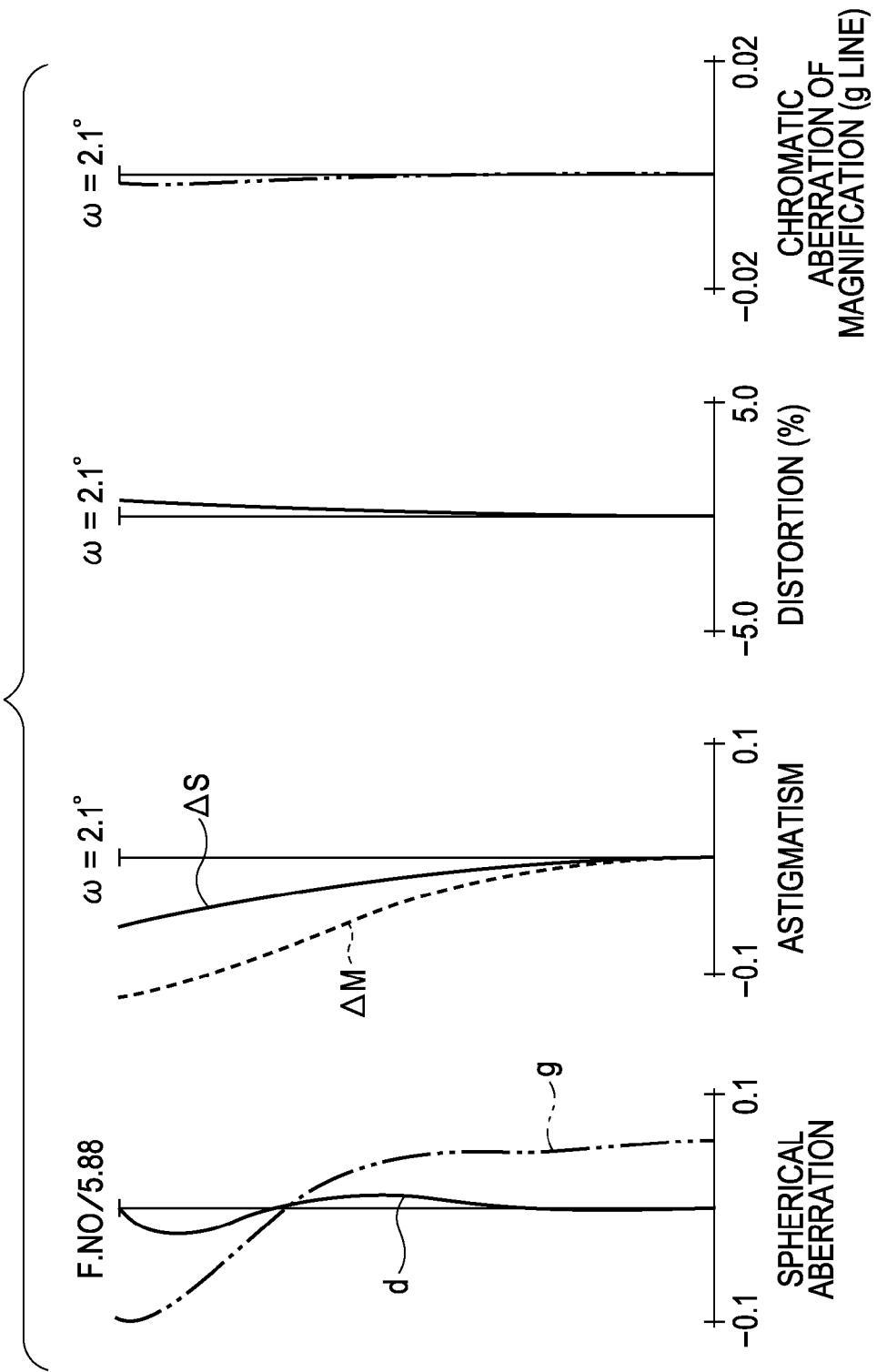
FIG. 9 illustrates aberrations at a telephoto end according to Numerical Example 3 of the present invention.

FIG. 7 is a sectional view of lenses at the wide-angle end of a zoom lens device according to a third embodiment of the present invention. FIGS. 8 and 9 illustrate aberrations at the wide-angle end and at the telephoto end of the zoom lens device according to the third embodiment, respectively.

Figure 10:
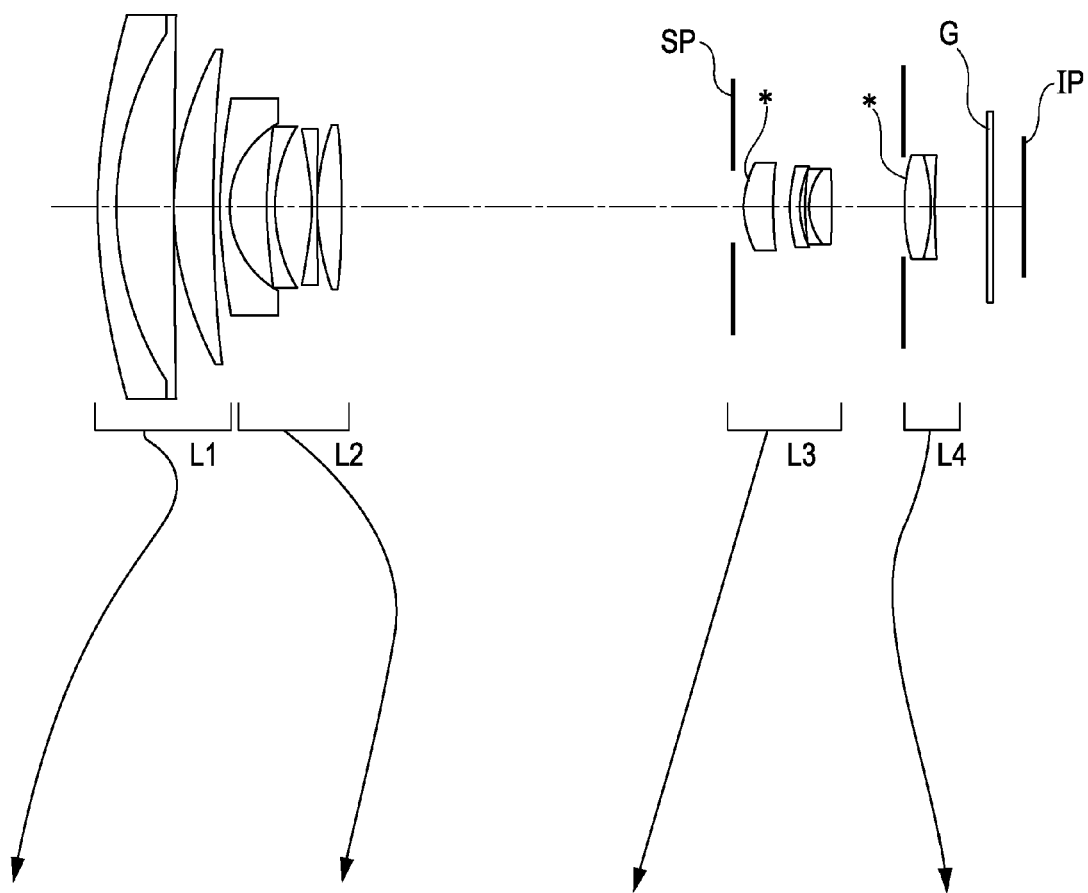
FIG. 10 is a sectional view of lenses at a wide-angle end according to Numerical Example 4 of the present invention, and shows a zoom locus.
Figure 11:
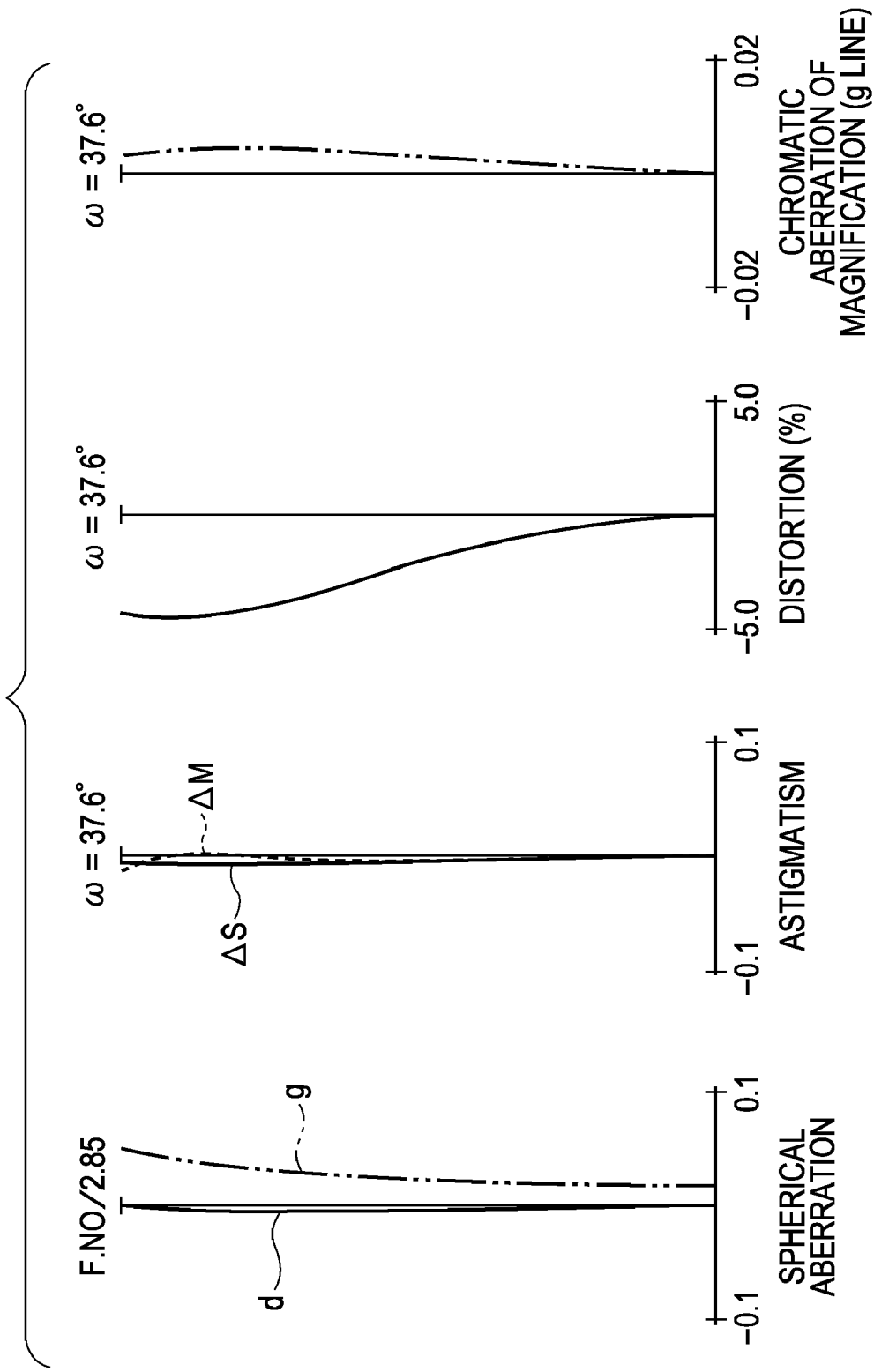
FIG. 11 illustrates aberrations at the wide-angle end according to Numerical Example 4 of the present invention.
Figure 12:
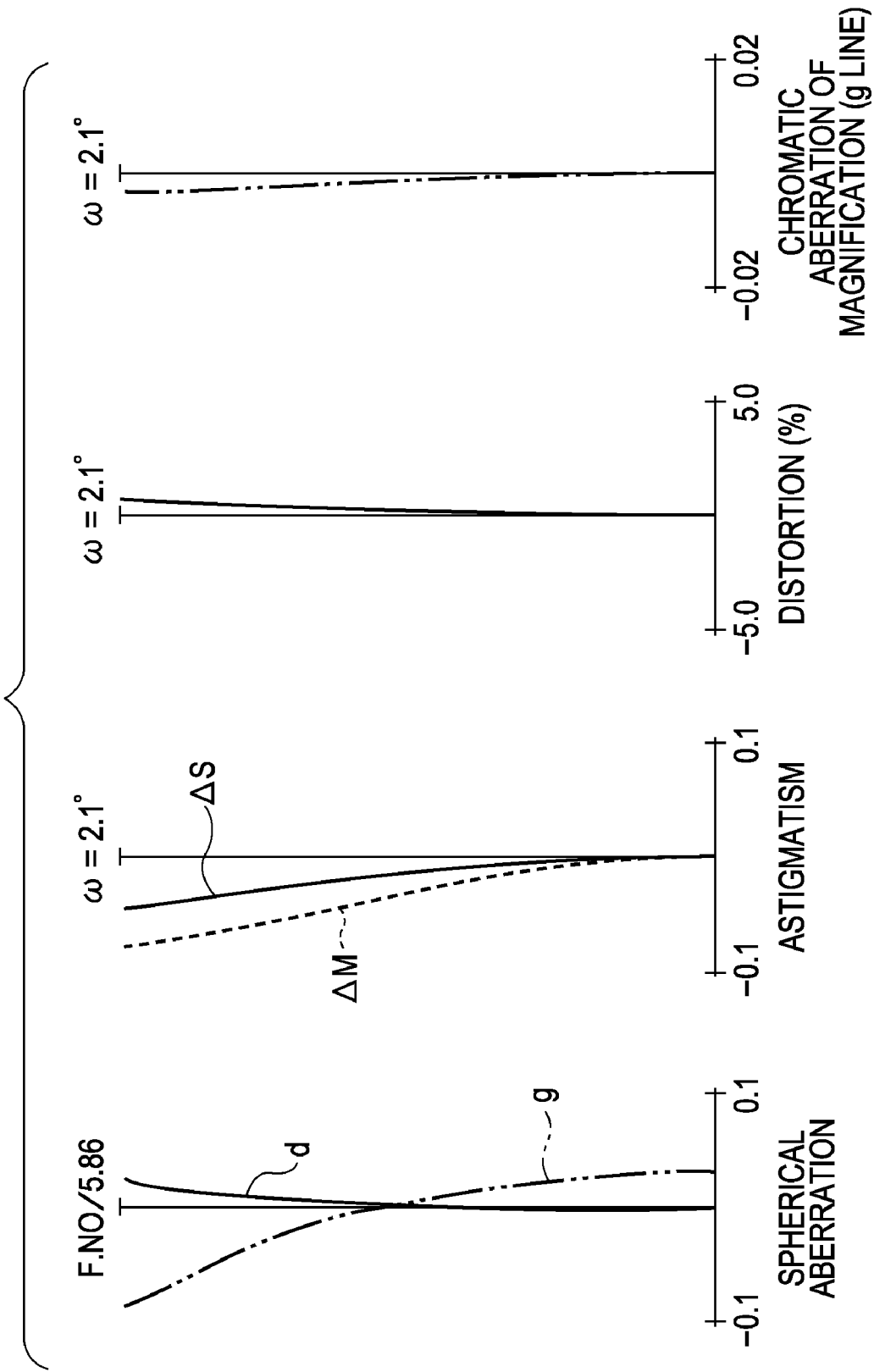
FIG. 12 illustrates aberrations at a telephoto end according to Numerical Example 4 of the present invention.

FIG. 10 is a sectional view of lenses at the wide-angle end of a zoom lens device according to a fourth embodiment of the present invention. FIGS. 11 and 12 illustrate aberrations at the wide-angle end and at the telephoto end of the zoom lens device according to the fourth embodiment, respectively.

Figure 13:
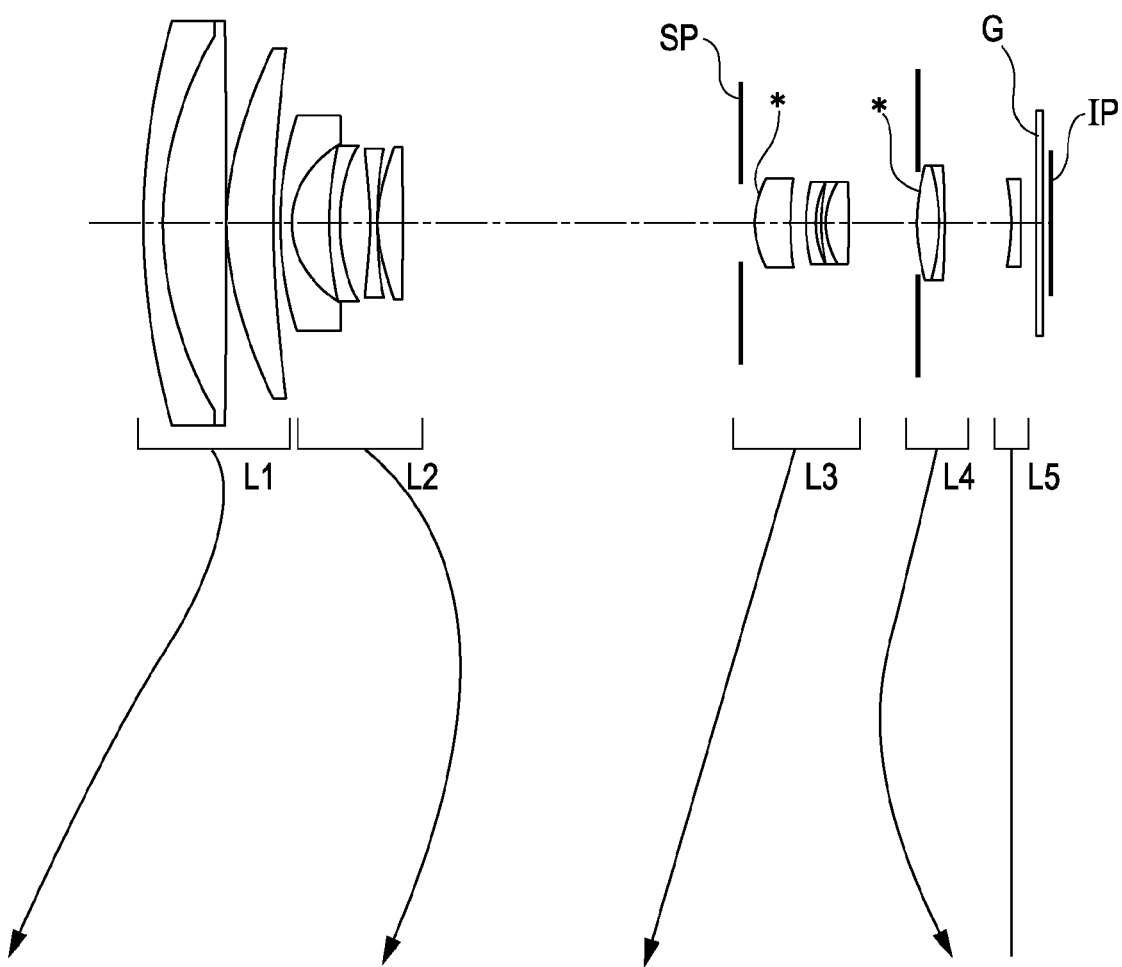
FIG. 13 is a sectional view of lenses at a wide-angle end according to Numerical Example 5 of the present invention, and shows a zoom locus.
Figure 14:
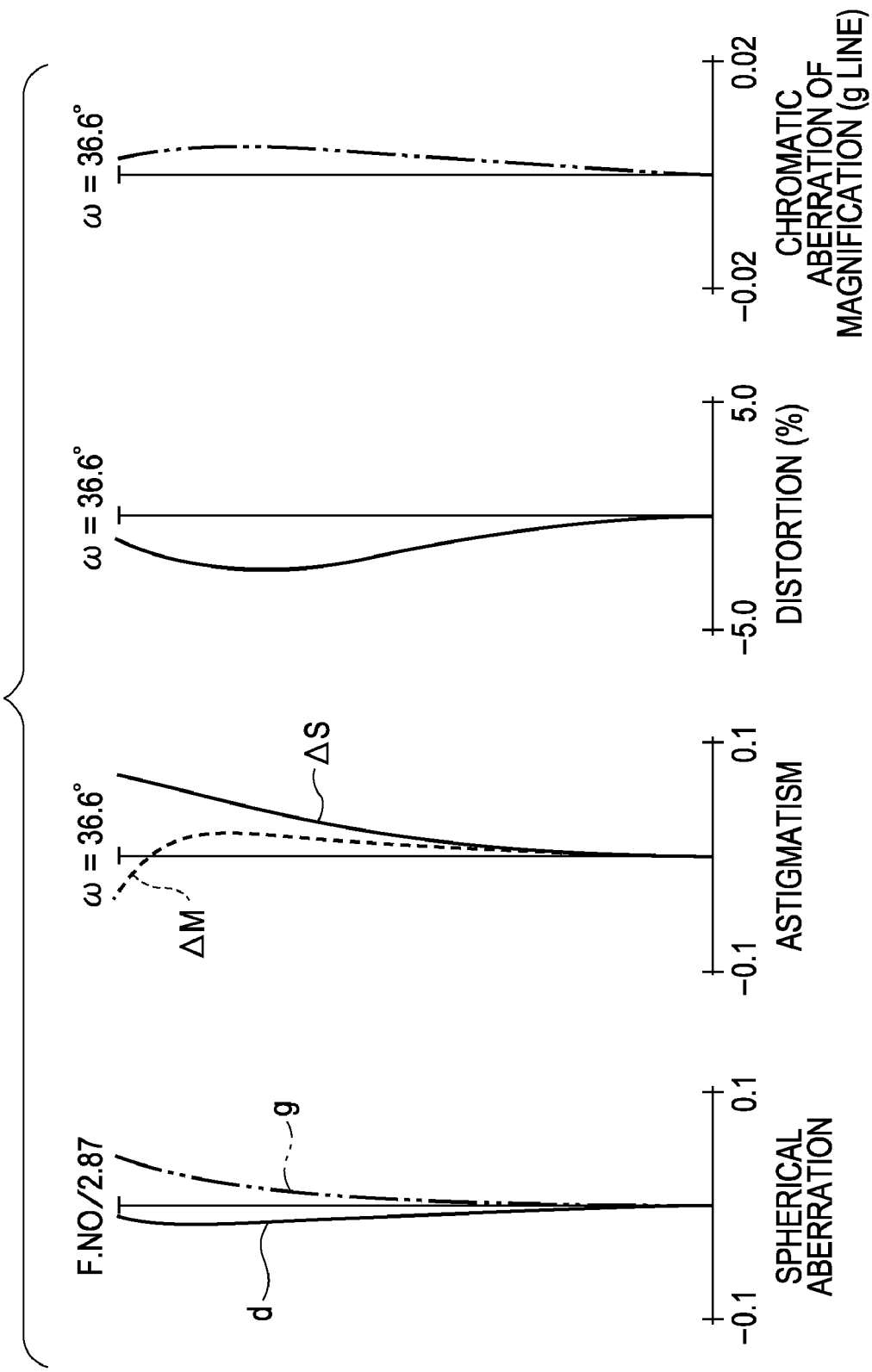
FIG. 14 illustrates aberrations at the wide-angle end according to Numerical Example 5 of the present invention.
Figure 15:
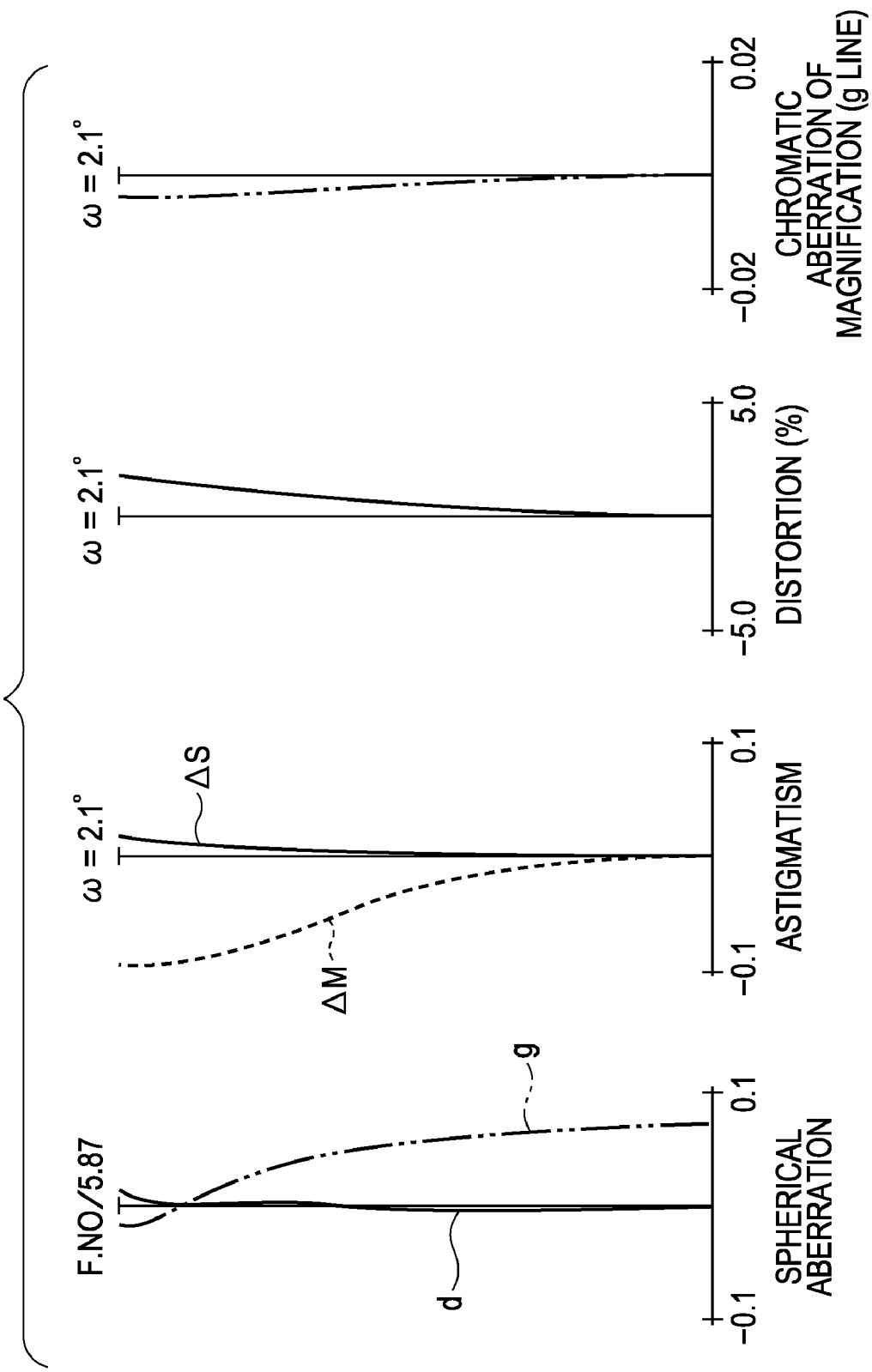
FIG. 15 illustrates aberrations at a telephoto end according to Numerical Example 5 of the present invention.

FIG. 13 is a sectional view of lenses at the wide-angle end of a zoom lens device according to a fifth embodiment of the present invention. FIGS. 14 and 15 illustrate aberrations at the wide-angle end and at the telephoto end of the zoom lens device according to the fifth embodiment, respectively.

Figure 16:
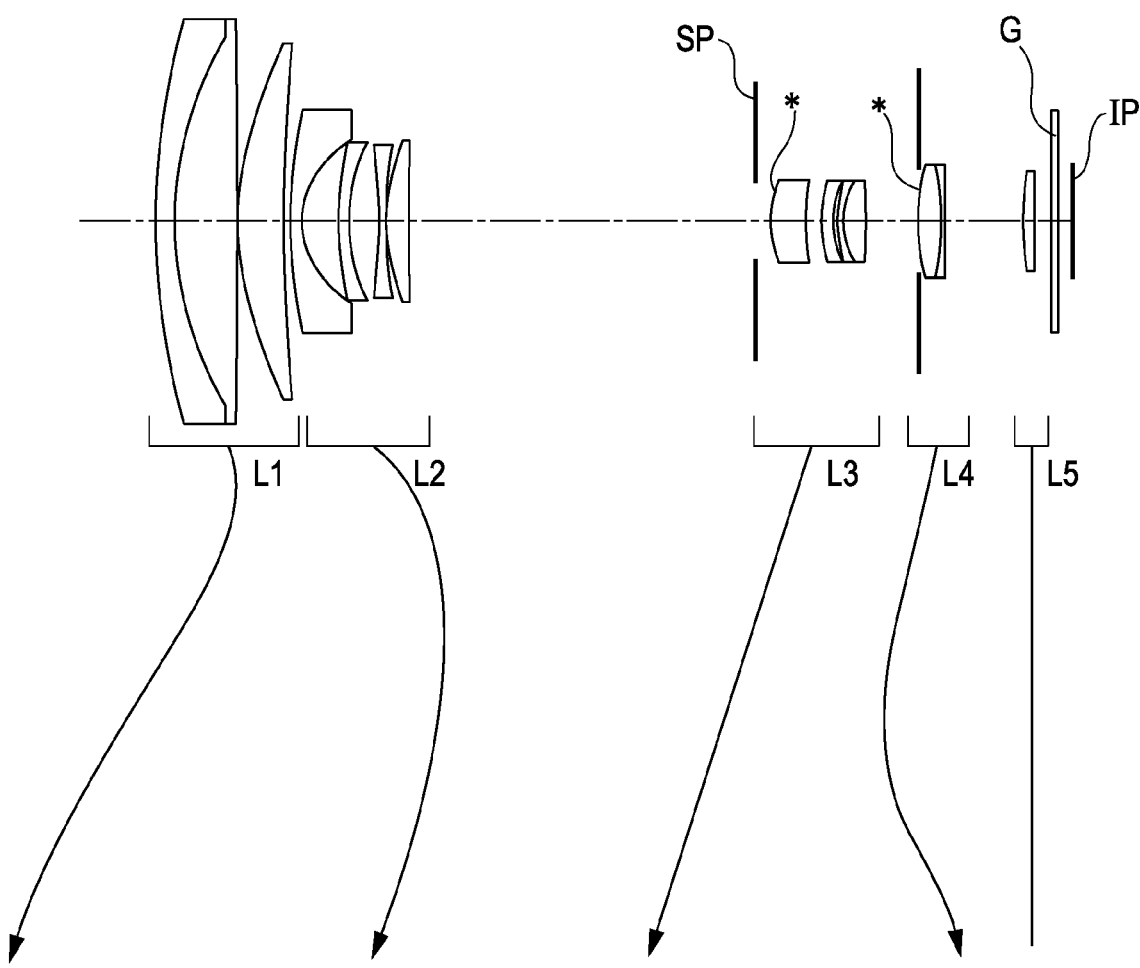
FIG. 16 is a sectional view of lenses at a wide-angle end according to Numerical Example 6 of the present invention, and shows a zoom locus.
Figure 17:
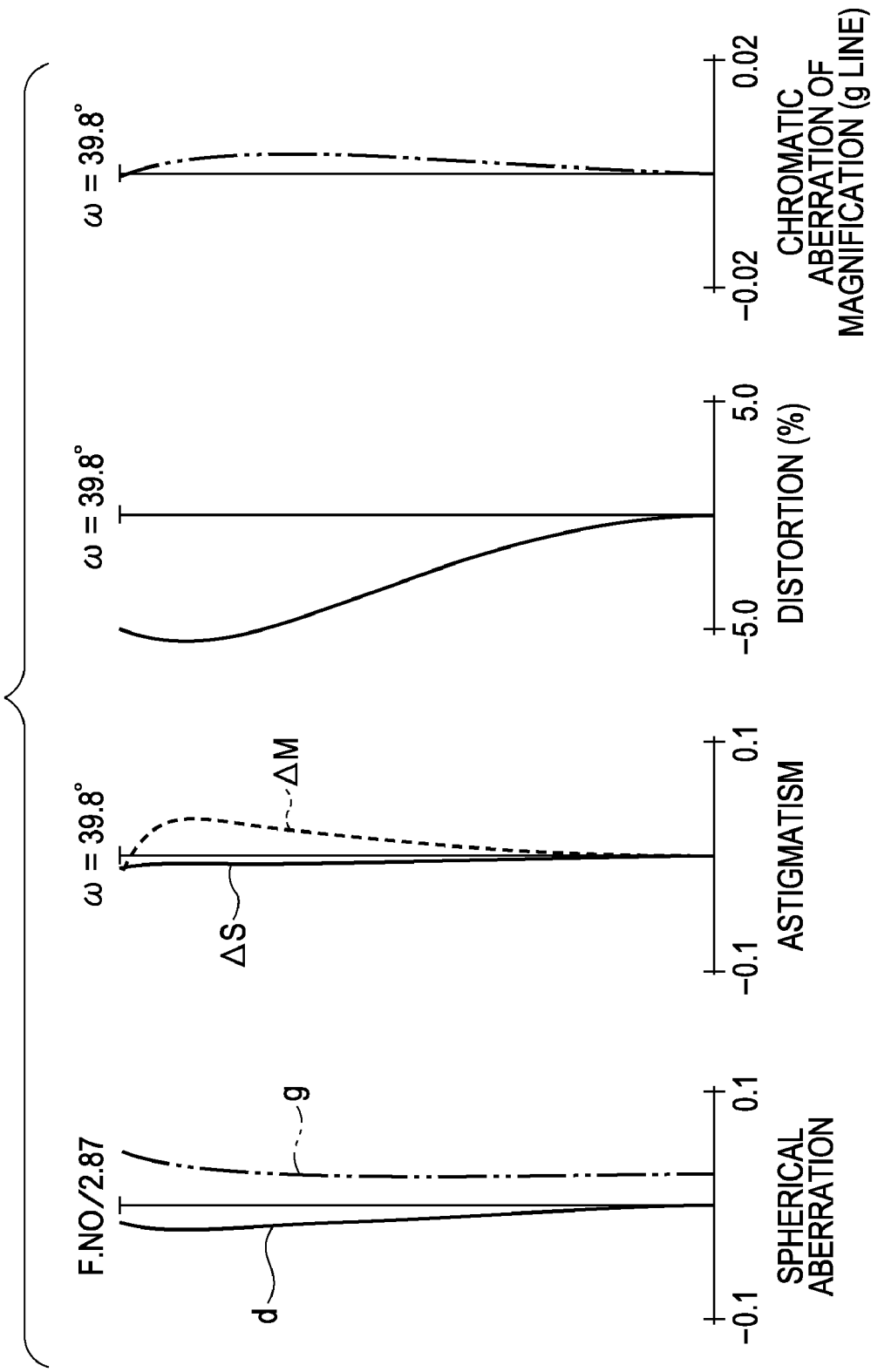
FIG. 17 illustrates aberrations at the wide-angle end according to Numerical Example 6 of the present invention.
Figure 18:
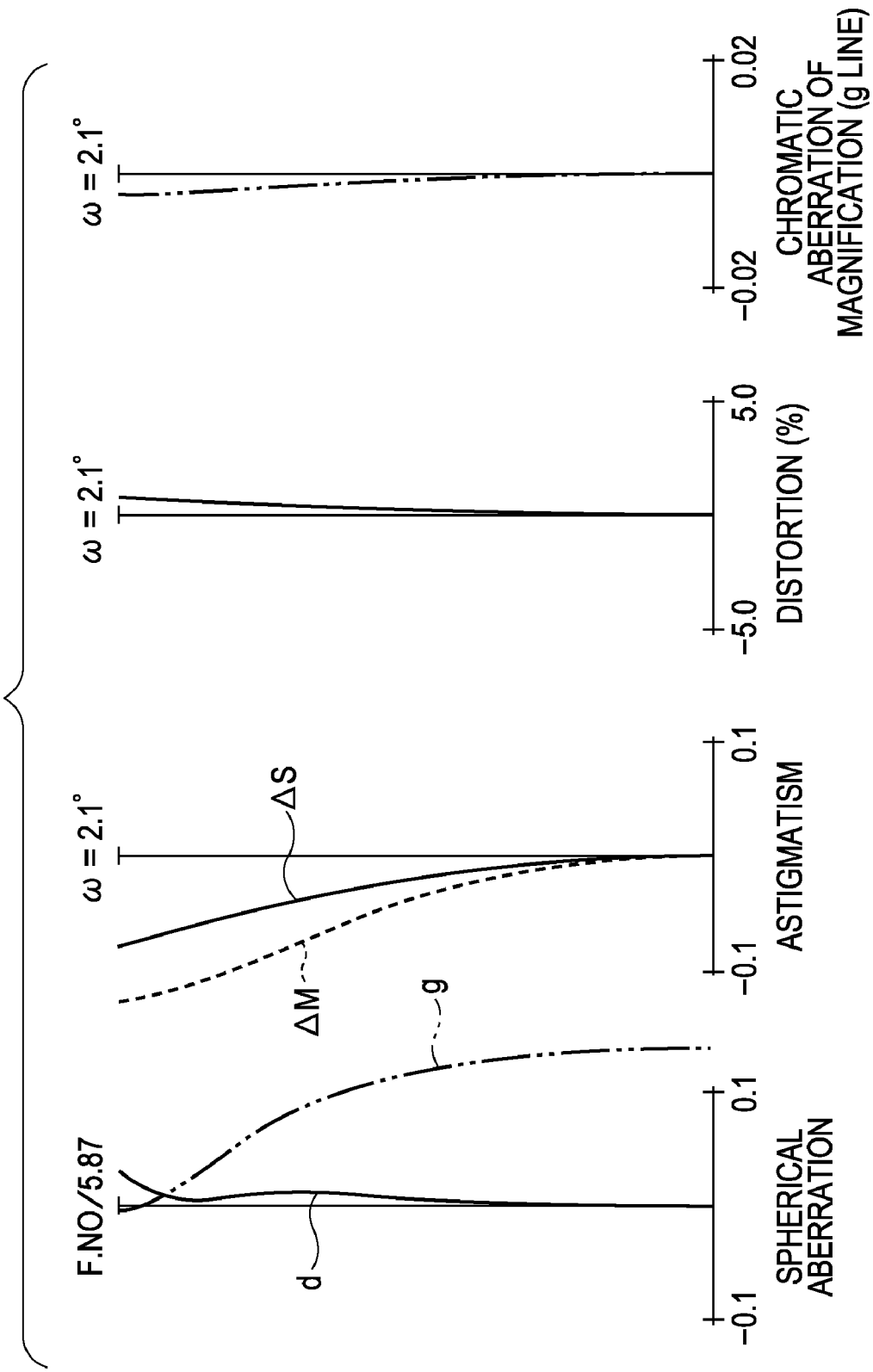
FIG. 18 illustrates aberrations at the wide-angle end according to Numerical Example 6 of the present invention.

FIG. 16 is a sectional view of lenses at the wide-angle end of a zoom lens device according to a sixth embodiment of the present invention. FIGS. 17 and 18 illustrate aberrations at the wide-angle end and at the telephoto end of the zoom lens device according to the sixth embodiment, respectively.

Figure 19:
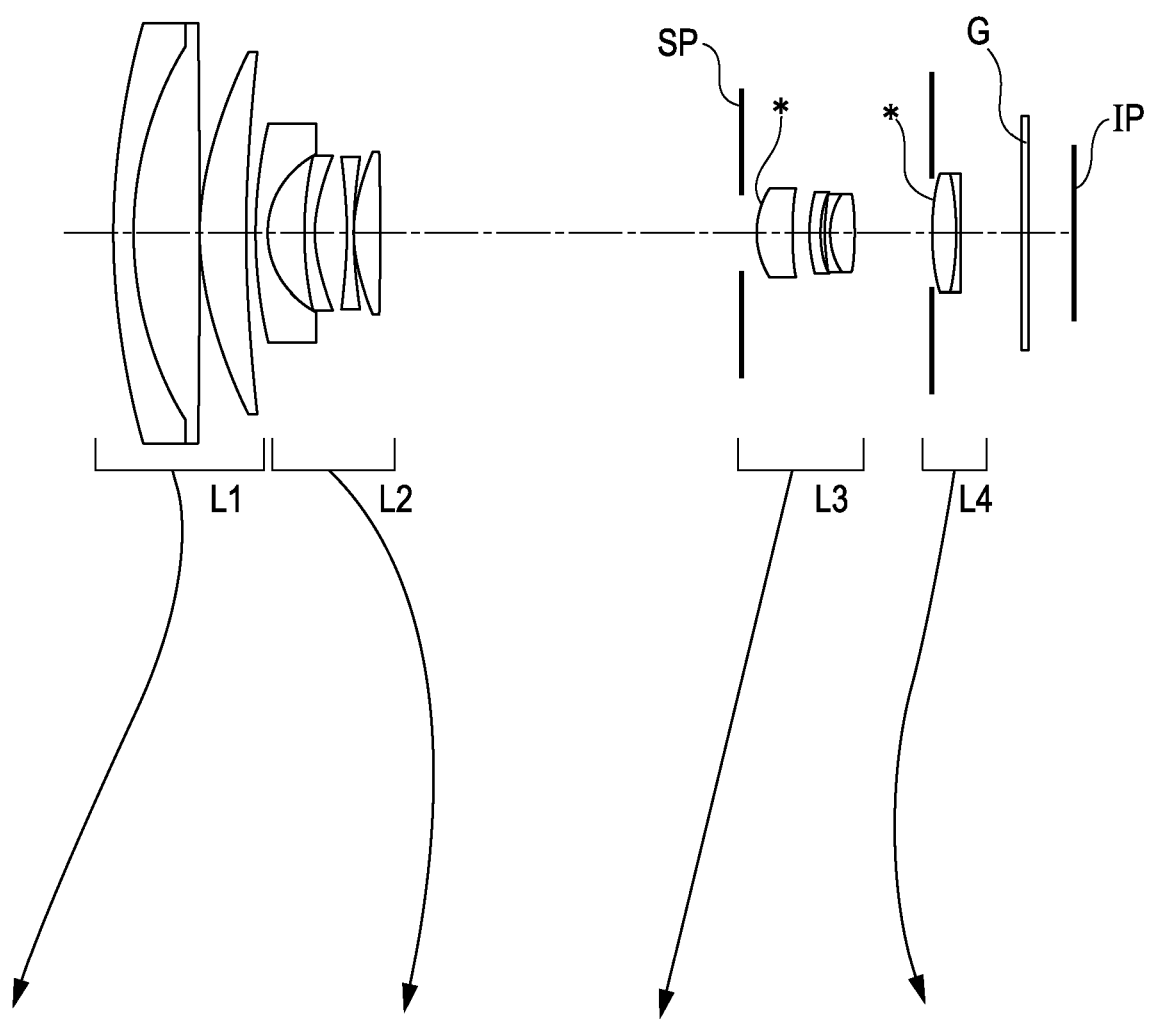
FIG. 19 is a sectional view of lenses at a wide-angle end according to Numerical Example 7 of the present invention, and shows a zoom locus.
Figure 20:
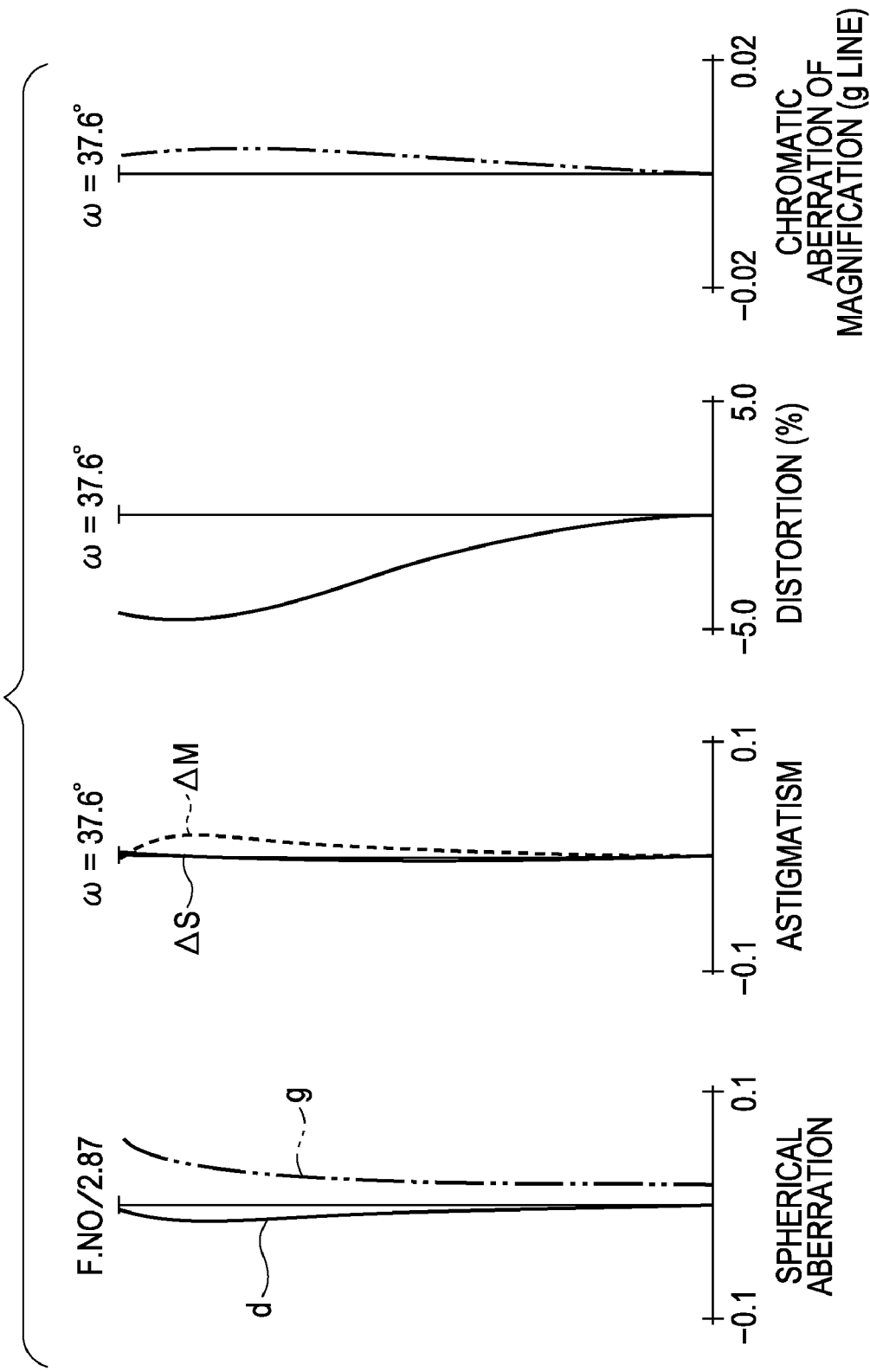
FIG. 20 illustrates aberrations at the wide-angle end according to Numerical Example 7 of the present invention.
Figure 21:
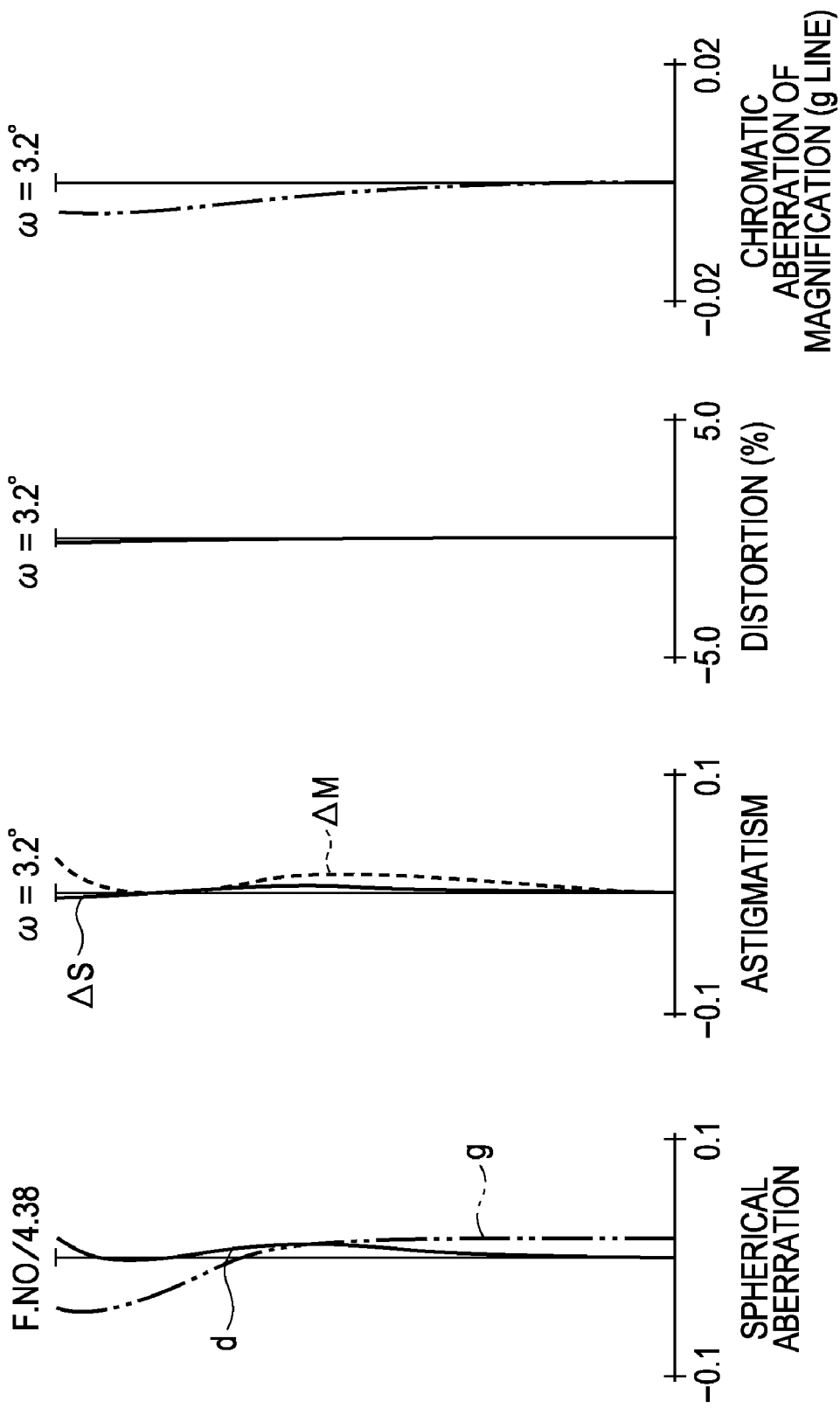
FIG. 21 illustrates aberrations at a telephoto end according to Numerical Example 7 of the present invention.

FIG. 19 is a sectional view of lenses at the wide-angle end of a zoom lens device according to a seventh embodiment of the present invention. FIGS. 20 and 21 illustrate aberrations at the wide-angle end and at the telephoto end of the zoom lens device according to the seventh embodiment, respectively.

Figure 22:
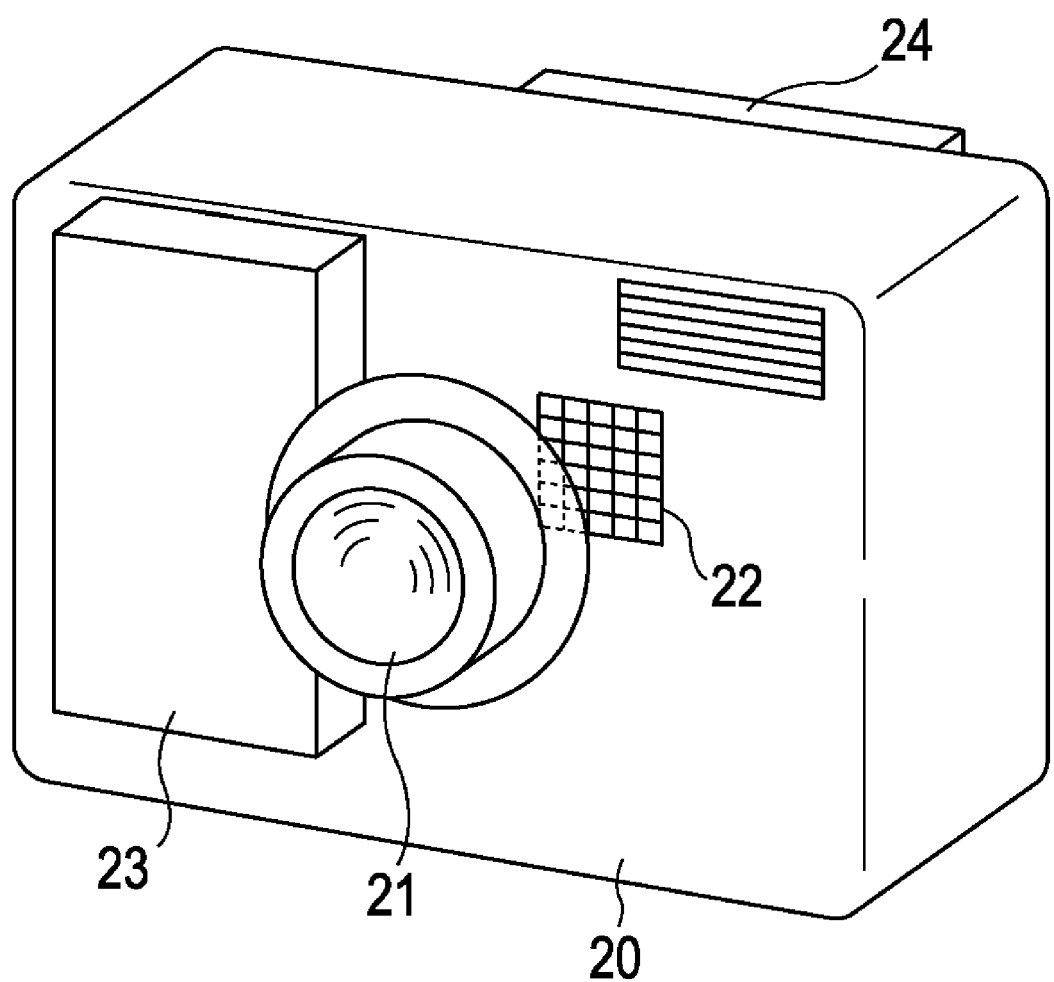
FIG. 22 is a schematic view of an image pickup apparatus according to the present invention.

FIG. 22 is a schematic view of a main portion of a camera (image pickup apparatus) including any one of the zoom lens devices according to the present invention. The zoom lens device of each of the embodiments is an image taking lens system used in the image pickup apparatus, such as a video camera, a digital camera, or a sliver-halide film camera.

In the sectional views of the lenses, the left side corresponds to the object side (front side), and the right side corresponds to the image side (rear side). In addition, in the sectional views of the lenses, i represents the order of a lens unit from the object side, and L1 represents an ith lens unit.

In the sectional view of the lenses in each of the first to fourth embodiments and the seventh embodiment, L1 denotes a first lens unit having a positive refractive power (optical power=reciprocal of the focal length), L2 denotes a second lens unit having a negative refractive power, L3 denotes a third lens unit having a positive refractive power, and L4 denotes a fourth lens unit having a positive refractive power.

In the sectional view of the lenses in the fifth embodiment, L1 denotes a first lens unit having a positive refractive power, L2 denotes a second lens unit having a negative refractive power, L3 denotes a third lens unit having a positive refractive power, L4 denotes a fourth lens unit having a positive refractive power, and L5 denotes a fifth lens unit having a negative refractive power.

In the sectional view of the lenses in the sixth embodiment, L1 denotes a first lens unit having a positive refractive power, L2 denotes a second lens unit having a negative refractive power, L3 denotes a third lens unit having a positive refractive power, L4 denotes a fourth lens unit having a positive refractive power, and L5 denotes a fifth lens unit having a positive refractive power.

In each of the sectional views of the lenses, SP denotes an aperture stop disposed at the object side of the third lens unit L3.

G denotes an optical block (essentially an optical element or an optical element unit not having refractive power) corresponding to, for example, an optical filter, a faceplate, a crystal low-pass filter, or an infrared-cut filter.

IP denotes an image plane. An image pickup surface of a solid-state image pickup element (a photoelectric conversion element), such as a CCD sensor or a CMOS sensor, is placed at the image plane IP when the zoom lens device is used as an image taking optical system of a video camera or a digital still camera. A photosensitive surface corresponding to a film surface is disposed at the image plane IP when a silver halide camera is used.

In the figures illustrating the aberrations, d and g denote a d line and a g line, respectively. ΔM and ΔS denote a meridional image plane and a sagittal image plane, respectively. A chromatic aberration of magnification is represented by a g line. ω denotes a half-field angle, and F.NO denotes an F number.

In each of the embodiments below, the wide-angle end and the telephoto end correspond to zooming positions at respective ends of a range in which zooming lens units are movable along an optical axis of a mechanism.

In each of the embodiments, each lens unit is moved from the wide-angle end to the telephoto end as indicated by a corresponding arrow during zooming.

More specifically, after moving the first lens unit L1 towards the image side when zooming from the wide-angle end to the telephoto end, the first lens unit L1 is moved towards the object side. That is, the first lens unit L1 moves towards the image side along a convex locus. The second lens unit L2 moves towards the object side after moving towards the image side. That is, the second lens unit L2 moves towards the image side along a convex locus.

The third lens unit L3 is moved towards the object side. The fourth lens unit L4 moves towards the object side along a convex locus so as to correct variations in the image plane position resulting from zooming.

In each of the fifth and sixth embodiments, the fifth lens unit L5 is fixed for zooming (during zooming).

When zooming is performed from the wide-angle end to the telephoto end, the first lens unit L1 is moved so that it is positioned closer to the object side at the telephoto end than at the wide-angle end. This causes a large zoom ratio to be obtained while the entire length of the lenses is kept small at the wide-angle end.

In each of the embodiments, the third lens unit L3 is moved towards the object side during zooming, so that zooming is performed by both the third lens unit L3 and the fourth lens unit L4. In addition, moving the first lens unit L1 having a positive refractive power causes the second lens unit L2 to have a large zooming effect. Therefore, a high zoom ratio can be obtained without setting the refractive powers of the first and second lens units L1 and L2 too large.

Further, a rear-focusing type in which focusing is performed by moving the fourth lens unit L4 along the optical axis is used.

Focusing from an object at infinity to a nearby object at the telephoto end is carried out by moving the fourth lens unit L4 (shown in the sectional views of the lenses) forward.

In each of the embodiments, during zooming, the aperture stop SP is moved together with the third lens unit L3. When the aperture stop SP moves together with the third lens unit L3, the number of units that are classified as moving/movable units is reduced, so that it is easier to simplify the mechanical structure.

In each of the embodiments, the distance between the position of the first lens unit L1 at the wide-angle end and the position of the first lens unit L1 that has maximally moved towards the image side is Ximg. That is, the distance between the position of the first lens unit L1 at the wide-angle end and the position closest to the image side in the movement locus of the first lens unit L1 during zooming from the wide-angle end to the telephoto end is Ximg.

In addition, the distance between the position of the first lens unit L1 at the wide-angle end and the position of the first lens unit L1 that has moved maximally towards the object side is Xobj. That is, the distance between the position of the first lens unit L1 at the wide-angle end and the position closest to the object side in the movement locus of the first lens unit L1 during zooming from the wide-angle end to the telephoto end is Xobj.

When the focal length at the wide-angle end of the zoom lens device is fw, the following Conditional Expressions (1) and (2) are satisfied:

$$0.1 < Ximg/fw < 2.5 \qquad (1)$$

$$4.80 < Xobj/fw < 15.00 \qquad (2)$$

In the zoom lens device in each of the embodiments, zooming is performed by moving the second lens unit L2 towards the image plane side. Here, to obtain a high magnification-change ratio, the lens units need to be moved so that the distance between the first and second lens units is increased at the telephoto end.

Conditional Expressions (1) and (2) define a maximum movement value towards the image side and a maximum movement value towards the object side when the first lens unit L1 moves towards the image side along a convex zoom locus.

When the lower limit of Conditional Expression (1) is passed, at a zooming position situated slightly towards the telephoto side from the wide-angle end, a height of incidence of an off-axis ray with respect to the first lens unit L1 is increased, thereby increasing the front-lens diameter.

When the upper limit of Conditional Expression (1) is passed, it becomes easy to obtain a high magnification change. However, the movement amount of the second lens unit L2 towards the image side becomes too large. As a result, the distance between the first lens unit L1 and the aperture stop SP is increased so that the second lens unit L2 is pushed out to the position of the second lens unit L2 at the wide-angle end.

Therefore, at the wide-angle end, the height of incidence of the off-axis ray with respect to the first lens unit L1 is increased, thereby increasing the front lens diameter.

When the lower limit of Conditional Expression (2) is passed, and an attempt is made to obtain a high zoom ratio, the following problem arises. That is, at the telephoto end, the movement amount of the first lens unit L1 towards the object side is reduced, thereby causing the movement locus of the second lens unit L2 to move monotonously towards the image side.

This results in the necessity of providing a space for movement of the second lens unit L2 at the wide-angle end, thereby causing the distance between the first lens unit L1 and the aperture stop SP to increase. This increases the front lens diameter. When the upper limit of Conditional Expression (2)

is passed, the overall length of the lenses at the telephoto end is increased, thereby increasing the size of the entire zoom lens device.

Further, when the upper limit of Conditional Expression (2) is passed, and an attempt is made to obtain a high zoom ratio, it becomes difficult to maintain a good optical performance when the first lens unit L1 is decentered due to its own weight. As a result, it becomes difficult to obtain a high zoom ratio.

Therefore, forming a structure in which Conditional Expressions (1) and (2) are satisfied makes it easy to obtain a high zoom ratio while reducing the front lens diameter.

Due to the aforementioned reason, it is desirable to set the numerical-value range of each of the Conditional Expressions (1) and (2) as follows:

$$0.2 < Ximg/fw < 1.7 \quad (1a)$$

$$4.80 < Xobj/fw < 10.0 \quad (2a)$$

Due to the aforementioned reason, it is more desirable to set Conditional Expressions (1a) and (2a) as follows:

$$0.25 < Ximg/fw < 1.70 \quad (1b)$$

$$4.80 < Xobj/fw < 7.70 \quad (2b)$$

As mentioned above, properly setting the movement conditions of the first lens unit L1 based on zooming makes it possible to provide a zoom lens device having a good optical performance over an entire zooming range from the wide-angle end to the telephoto end, while the front lens diameter is reduced.

In each of the embodiments, it is desirable that at least one of the following conditions is satisfied. This makes it possible to obtain advantages corresponding to the respective conditions.

Transverse magnifications (lateral magnifications, or magnifications) at the wide-angle end and the telephoto end of the second lens unit L2 are $\beta 2w$ and $\beta 2t$, respectively. Transverse magnifications (lateral magnifications, or magnifications) at the wide-angle end and the telephoto end of the third lens unit L3 are $\beta 3w$ and $\beta 3t$, respectively. The focal length of the second lens unit L2 is f2, and the focal length of the third lens unit L3 is f3. The focal length of the first lens unit L1 is f1. Here, it is desirable that at least one of the following Conditional Expressions (3) to (6) is satisfied:

$$4.0 < \beta 2t/\beta 2w < 12.0 \quad (3)$$

$$1.5 < \beta 3t/\beta 3w < 6.0 \quad (4)$$

$$-0.65 < f2/f3 < -0.35 \quad (5)$$

$$11.8 < f1/fw < 20.0 \quad (6)$$

Conditional Expressions (3) and (4) define ranges of proper zooming of the second and third lens units L2 and L3, respectively. When the lower limit of Conditional Expression (3) is passed, and an attempt is made to obtain a high zoom ratio, a zooming action of the third lens unit L3 becomes too strong, thereby making it difficult to correct aberrations. In addition, other problems, such as an increase in manufacturing sensitivity, occur, thereby making it difficult to obtain a high zoom ratio.

When the upper limit of Conditional Expression (3) is passed, and an attempt is made to obtain a high zoom ratio, a zooming action of the second lens unit L2 becomes too strong, thereby making it difficult to correct aberrations. In addition, other problems, such as an increase in manufacturing sensitivity, occur, thereby making it difficult to obtain a high zoom ratio.

When the lower limit of Conditional Expression (4) is passed, and an attempt is made to obtain a high zoom ratio, the zooming action of the second lens unit L2 becomes too strong, thereby making it difficult to correct aberrations. In addition, other problems, such as an increase in manufacturing sensitivity, occur, thereby making it difficult to obtain a high zoom ratio.

When the upper limit of Conditional Expression (4) is passed, and an attempt is made to obtain a high zoom ratio, the zooming action of the third lens unit L3 becomes too strong, thereby making it difficult to correct aberrations. In addition, other problems, such as an increase in manufacturing sensitivity, occur, thereby making it difficult to obtain a high zoom ratio.

If a structure in which Conditional Expressions (3) and (4) are satisfied is used, not only the second lens unit L2, but also the third lens unit L3 is largely involved in performing zooming, so that the second lens unit L2 is moved towards the image side along a convex locus during the zooming.

Here, compared to a case in which the second lens unit L2 moves in a straight line towards the image side, the necessity of providing a space for movement of the second lens unit L2 towards the image side is reduced. Therefore, the second lens unit L2 at the wide-angle end can be disposed closer to the aperture stop SP.

This makes it possible to dispose the first lens unit L1 at the wide-angle end at a location that is close to the aperture stop SP. That is, it becomes easy to reduce the height of an off-axis ray passing through the front lens (first lens unit L1). As a result, the front lens diameter can be reduced.

Due to the aforementioned reason, it is further desirable to set the numerical-value range of each of the Conditional Expressions (3) and (4) as follows:

$$4.6 < \beta 2t/\beta 2w < 10.0 \quad (3a)$$

$$2.9 < \beta 3t/\beta 3w < 6.0 \quad (4a)$$

Due to the aforementioned reason, it is further desirable to set the numerical-value range of each of the Conditional Expressions (3a) and (4a) as follows:

$$4.6 < \beta 2t/\beta 2w < 8.3 \quad (3b)$$

$$2.9 < \beta 3t/\beta 3w < 5.0 \quad (4b)$$

Due to the aforementioned reason, it is further desirable to set the numerical-value range of each of the Conditional Expressions (3b) and (4b) as follows:

$$4.6 < \beta 2t/\beta 2w < 6.5 \quad (3c)$$

$$2.9 < \beta 3t/\beta 3w < 4.5 \quad (4c)$$

In the zoom lens device in each of the embodiments, when zooming is carried out with only the second lens unit L2 to obtain a high zoom ratio, it becomes difficult to correct aberrations. In addition, other problems, such as an increase in manufacturing sensitivity, occur.

To overcome this problem, the third lens unit L3 is also made to adequately perform zooming, to reduce the extent by which the second lens unit L2 is involved in the zooming.

Conditional Expression (5) defines the positions where the first and second lens units L2 and L3 provide proper refractive powers required for the third lens unit L3 to perform adequate zooming.

When the lower limit of Conditional Expression (5) is passed, the zooming action of the second lens unit L2 is reduced, thereby making it difficult to obtain a high zoom ratio. In contrast, when the upper limit of Conditional Expression (5) is passed, the zooming action of the third lens unit L3 is reduced, thereby making it difficult to obtain a high zoom ratio.

Due to the aforementioned reason, it is further desirable to set the numerical value range of Conditional Expression (5) as follows:

$$-0.65 < f2/f3 < -0.45 \quad (5a)$$

Due to the aforementioned reason, it is further desirable to set the numerical value range of the Conditional Expression (5a) as follows:

$$-0.55 < f2/f3 < -0.45 \quad (5b)$$

The Conditional Expression (6) defines a proper focal-length range of the first lens unit L1. When the lower limit of Conditional Expression (6) is passed, the refractive power of the first lens unit L1 becomes too strong, thereby increasing coma aberration and spherical aberration at the telephoto end.

When the upper limit of Conditional Expression (6) is passed, the refractive power of the first lens unit L1 becomes too weak, thereby increasing the front lens diameter.

Due to the aforementioned reason, it is further desirable to set the numerical value range of Conditional Expression (6) as follows:

$$11.8 < f1/fw < 14.5 \quad (6a)$$

Due to the aforementioned reason, it is further desirable to set the numerical value range of Conditional Expression (6a) as follows:

$$11.8 < f1/fw < 13.5 \quad (6b)$$

Next, the distinctive characteristics of the structure of each lens unit will be described.

Since the effective lens diameter of the first lens unit L1 becomes larger than those of the other lens units, it is desirable to user fewer lenses to reduce the weight of the first lens unit L1.

The first lens unit L1 includes a cemented lens and a single positive lens in that order from the object side to the image side. The cemented lens has one meniscus negative lens, whose object-side surface is a convex surface, and one positive lens joined to each other. This causes spherical aberration and chromatic aberration, which occur frequently when a high magnification-change ratio is achieved, to be properly corrected.

The second lens unit L2 includes a first lens having a negative refractive power, a second lens having a negative refractive power, a third lens having a negative refractive power, and a fourth lens L24 having a positive refractive power, in that order from the object side to the image side. The lowest refractive index among the refractive indices of materials of the respective lenses is greater than or equal to 1.8.

In the structure of the second lens unit L2, the second lens unit L2 is easily disposed closer to the image side with respect to the position of a principal point by the above-described setting. This makes it easy to reduce the distance between the first lens unit L1 and the aperture stop SP at the wide-angle end, so that it is easy to reduce the front lens diameter.

Since the refractive indices of the materials of the lenses of the second lens unit L2 are high, it is easy to reduce the curvatures of the surfaces of the negative lenses. This makes it possible to reduce the thickness of the second lens unit L2 in the optical axis direction. Since the second lens unit L2 is thin, the distance between the first lens unit L1 and the aperture stop SP at the wide-angle end can be reduced, so that the front lens diameter can be reduced.

The third lens unit L3 includes a positive lens, a meniscus negative lens, and a cemented lens in that order from the object side to the image side. The object-side surface of the positive lens is a convex surface. The object-side surface of the negative lens is a convex surface. The cemented lens has a meniscus negative lens, whose object side has a convex shape, and a positive lens joined to each other.

This reduces variations in aberrations caused by zooming.

The fourth lens unit L4 includes a cemented lens having a positive lens, whose object side has a convex shape, and a negative lens joined to each other.

This reduces variations in chromatic aberration when focusing is carried out at the fourth lens unit L4. The fourth lens unit L4 corrects variations in the position of the image plane caused by zooming of the first to third lens units L1 to L3.

In the fifth embodiment, the fifth lens unit L5 comprises a single negative lens whose concave surface faces the object side.

In the sixth embodiment, the fifth lens unit L5 comprises a single positive lens.

Next, the structures of the lenses of each of the embodiments will be described.

In the first to fourth embodiments and the seventh embodiment, the zoom lens device comprises, from the object side to the image side, the first lens unit L1 having a positive refractive power, the second lens unit L2 having a negative refractive power, the third lens unit L3 having a positive refractive power, and the fourth lens unit L4 having a positive refractive power.

During zooming from the wide-angle end to the telephoto end, the first lens unit L1 moves so as to reciprocate towards the object side after moving towards the image side. The second lens unit L2 moves so as to reciprocate towards the object side after moving towards the image side. The third lens unit L3 moves towards the object side. The fourth lens unit L4 moves so as to correct the position of the image plane.

The third lens unit L3 and the fourth lens unit L4 each have one aspherical surface, and correct spherical aberration and curvature of field. The aperture stop SP is provided at the object side of the third lens unit L3. The glass block G, such as a crystal low-pass filter or an infrared-cut filter, is disposed between the fourth lens unit L4 and the image plane IP.

In the fifth embodiment, the zoom lens device comprises, from the object side to the image side, the first lens unit L1 having a positive refractive power, the second lens unit L2 having a negative refractive power, the third lens unit L3 having a positive refractive power, the fourth lens unit L4 having a positive refractive power, and a fifth lens unit L5 having a negative refractive power.

During zooming from the wide-angle end to the telephoto end, the first lens unit L1 is moved so as to reciprocate towards the object side after moving towards the image side. The second lens unit L2 is moved so as to reciprocate towards the object side after moving towards the image side. The third lens unit L3 moves towards the object side. The fourth lens unit L4 moves so as to correct the position of the image plane. The fifth lens unit L5 is fixed.

The third lens unit L3 and the fourth lens unit L4 each have one aspherical surface, and correct spherical aberration and curvature of field. The aperture stop SP is provided at the object side of the third lens unit L3. The glass block G, such as a crystal low-pass filter or an infrared-cut filter, is disposed between the fifth lens unit L5 and the image plane IP.

The sixth embodiment differs from the fifth embodiment only in that the fifth lens unit L5 has a positive refractive power. The other structural features are the same.

Next, an embodiment of a digital still camera using the zoom lens device according to any one of the embodiments as an image taking optical system will be described with reference to FIG. 22.

In FIG. 22, reference numeral 20 denotes a camera body, and reference numeral 21 denotes an image taking optical system used as the zoom lens device of any one of the above-described first to seventh embodiments. Reference numeral 22 denotes a solid-state image pickup element (a photoelectric conversion element), such as a CCD sensor or a CMOS sensor, that is built in the camera body 20 and that receives light of a subject image formed by the image taking optical system 21. Reference numeral 23 denotes a memory for recording information corresponding to the subject image subjected to photoelectric conversion by the solid-state image pickup element 22. Reference numeral 24 denotes a finder including, for example, a liquid crystal display panel, and used for observing the subject image formed on the solid-state image pickup element 22.

By using the zoom lens device according to the present invention in the image pickup apparatus (such as the digital still camera), it is possible to realize a small image pickup apparatus providing a high optical performance.

Next, Numerical Examples 1 to 7 corresponding to the first to seventh embodiments according to the present invention will be discussed. In each of the numerical examples, i denotes the order of an optical surface from the object side, Ri denotes a curvature radius of an ith optical surface, Di denotes the distance between the ith surface and an (i+1)th surface, and Ni and vi denote a refractive index and an Abbe number of a material of an ith optical member with respect to a d line, respectively.

When k denotes eccentricity, B, C, D, and E each denote an aspheric coefficient, and x denotes a displacement with reference to a vertex of the i-th optical surface in the optical axis direction at a position at a height h from the optical axis, an aspherical surface shape is represented as follows:

$$x=(h^2/R)/[1+[1-(1+k)(h/R)^2]^{1/2}]+Bh^4+Ch^6+Dh^8+Eh^{10}$$

R represents a curvature radius. For example, "E-Z" represents "$10^{-Z}$." f denotes a focal length. Fno denotes an F number. ω denotes a half-field angle.

In each numerical example, the two last surfaces correspond to the surfaces of the optical block, such as a filter or a faceplate.

The amounts of movements in the optical axis direction of the first to third lens units L1 to L3 during zooming from the wide-angle end to the telephoto end are M1, M2, and M3, respectively. Here, the movement amounts M1, M2, and M3 are determined as follows:

$$M1=a1\cdot x+a2\cdot x^2+a3\cdot x^3+a4\cdot x^4+a5\cdot x^5+a6\cdot x^6+a7\cdot x^7+a8\cdot x^8+a9\cdot x^9+a10\cdot x^{10}$$

$$M2=b1\cdot x+b2\cdot x^2+b3\cdot x^3+b4\cdot x^4+b5\cdot x^5+b6\cdot x^6+b7\cdot x^7+b8\cdot x^8+b9\cdot x^9+b10\cdot x^{10}$$

$$M3=c1\cdot x$$

$0 \leq x \leq 1$. x=0 represents the wide-angle end. x=1 represents the telephoto end. The amount of movement towards the image plane side is positive. a1 to a10, b1 to b10, and c1 denote movement coefficients.

Correspondences in each of the numerical examples with the aforementioned conditional expressions are shown in Table 1.

Numerical Example 1 f = 5.20~102.33 Fno = 2.83~5.81 2ω = 75.2°~4.3°

| | | | |
|---|---|---|---|
| R 1 = 67.925 | D 1 = 1.90 | N 1 = 1.806100 | v 1 = 33.3 |
| R 2 = 34.767 | D 2 = 5.93 | N 2 = 1.496999 | v 2 = 81.5 |
| R 3 = 2219.771 | D 3 = 0.10 | | |
| R 4 = 33.644 | D 4 = 4.36 | N 3 = 1.603112 | v 3 = 60.6 |
| R 5 = 125.629 | D 5 = variable | | |
| R 6 = 49.420 | D 6 = 1.00 | N 4 = 1.882997 | v 4 = 40.8 |
| R 7 = 8.897 | D 7 = 3.78 | | |
| R 8 = 65.877 | D 8 = 0.85 | N 5 = 1.882997 | v 5 = 40.8 |
| R 9 = 16.096 | D 9 = 3.00 | | |
| R10 = −47.560 | D10 = 0.75 | N 6 = 1.882997 | v 6 = 40.8 |
| R11 = 74.951 | D11 = 0.10 | | |
| R12 = 21.945 | D12 = 2.31 | N 7 = 1.922860 | v 7 = 18.9 |
| R13 = −223.123 | D13 = variable | | |
| R14 = stop | D14 = 1.39 | | |
| *R15 = 10.419 | D15 = 3.60 | N 8 = 1.743198 | v 8 = 49.3 |
| R16 = 35.520 | D16 = 1.58 | | |
| R17 = 16.696 | D17 = 1.05 | N 9 = 1.806100 | v 9 = 33.3 |
| R18 = 9.948 | D18 = 0.28 | | |
| R19 = 15.912 | D19 = 0.60 | N10 = 2.003300 | v10 = 28.3 |
| R20 = 6.800 | D20 = 2.10 | N11 = 1.693501 | v11 = 53.2 |
| R21 = −104.352 | D21 = variable | | |
| R22 = 0.000 | D22 = 0.00 | | |
| *R23 = 23.724 | D23 = 2.85 | N12 = 1.730770 | v12 = 40.5 |
| R24 = −14.113 | D24 = 0.50 | N13 = 1.717362 | v13 = 29.5 |
| R25 = 129.973 | D25 = variable | | |
| R26 = ∞ | D26 = 0.75 | N14 = 1.516330 | v14 = 64.1 |
| R27 = ∞ | | | |

| | focal length | | |
|---|---|---|---|
| variable distance | 5.20 | 32.66 | 102.33 |
| D 5 | 0.80 | 28.76 | 38.90 |
| D13 | 34.06 | 5.27 | 1.88 |
| D21 | 7.58 | 9.00 | 38.72 |
| D25 | 5.41 | 15.45 | 1.76 |

Aspheric Coefficient

| | | | |
|---|---|---|---|
| 15th surface: | k = 5.22482e−02<br>D = 2.50837e−08 | B = −5.72674e−05<br>E = −6.91845e−10 | C = −7.74949e−07 |
| 23rd surface: | k = −4.38897e−01<br>D = −2.02940e−08 | B = −4.42394e−06<br>E = 3.17791e−10 | C = 5.42763e−07 |

Movement Coefficient

| | | | |
|---|---|---|---|
| 1st unit: | a1 = 3.62765e+01<br>a4 = 1.94697e+02 | a2 = −1.98085e+02<br>a5 = −1.26975e+02 | a3 = 6.06766e+01 |
| 2nd unit: | b1 = 1.02490e+02<br>b4 = 1.23044e+02 | b2 = −1.65280e+02<br>b5 = −6.07188e+01 | b3 = 5.15621e+00 |
| 3rd unit: | c1 = −2.74901e+01 | | |

Numerical Example 2 f = 5.20~102.24 Fno = 2.87~5.83 2ω = 75.2°~4.3°

| | | | |
|---|---|---|---|
| R 1 = 70.756 | D 1 = 1.90 | N 1 = 1.806100 | v 1 = 33.3 |
| R 2 = 35.603 | D 2 = 5.88 | N 2 = 1.496999 | v 2 = 81.5 |
| R 3 = 6219.853 | D 3 = 0.10 | | |
| R 4 = 34.737 | D 4 = 4.35 | N 3 = 1.603112 | v 3 = 60.6 |
| R 5 = 141.972 | D 5 = variable | | |
| R 6 = 50.161 | D 6 = 1.00 | N 4 = 1.882997 | v 4 = 40.8 |
| R 7 = 8.871 | D 7 = 3.81 | | |

-continued f = 5.20~102.24 Fno = 2.87~5.83 2ω = 75.2°~4.3°

| | | | |
|---|---|---|---|
| R 8 = 63.421 | D 8 = 0.85 | N 5 = 1.882997 | ν 5 = 40.8 |
| R 9 = 16.760 | D 9 = 2.91 | | |
| R10 = −52.934 | D10 = 0.75 | N 6 = 1.882997 | ν 6 = 40.8 |
| R11 = 64.163 | D11 = 0.10 | | |
| R12 = 21.229 | D12 = 2.30 | N 7 = 1.922860 | ν 7 = 18.9 |
| R13 = −443.451 | D13 = variable | | |
| R14 = stop | D14 = 1.39 | | |
| *R15 = 10.252 | D15 = 3.18 | N 8 = 1.743198 | ν 8 = 49.3 |
| R16 = 36.275 | D16 = 1.82 | | |
| R17 = 18.242 | D17 = 1.05 | N 9 = 1.806100 | ν 9 = 33.3 |
| R18 = 9.667 | D18 = 0.26 | | |
| R19 = 14.736 | D19 = 0.60 | N10 = 2.003300 | ν10 = 28.3 |
| R20 = 6.874 | D20 = 2.07 | N11 = 1.693501 | ν11 = 53.2 |
| R21 = −116.545 | D21 = variable | | |
| R22 = 0.000 | D22 = 0.00 | | |
| *R23 = 23.388 | D23 = 2.52 | N12 = 1.743198 | ν12 = 49.3 |
| R24 = −30.811 | D24 = 0.50 | N13 = 1.717362 | ν13 = 29.5 |
| R25 = 110.106 | D25 = variable | | |
| R26 = ∞ | D26 = 0.75 | N14 = 1.516330 | ν14 = 64.1 |
| R27 = ∞ | | | |

| | focal length | | |
|---|---|---|---|
| variable distance | 5.20 | 37.49 | 102.24 |
| D 5 | 0.80 | 31.09 | 38.49 |
| D13 | 34.44 | 4.78 | 1.88 |
| D21 | 7.23 | 11.11 | 38.63 |
| D25 | 5.43 | 15.31 | 2.46 |

Aspheric Coefficient

| | | | |
|---|---|---|---|
| 15th surface: | k = 4.40217e−02 D = 1.25757e−08 | B = −5.94488e−05 E = −4.84879e−10 | C = −5.65696e−07 |
| 23rd surface: | k = −4.78176e−01 D = −3.14984e−08 | B = −5.01954e−06 E = 4.85734e−10 | C = 8.05793e−07 |

Movement Coefficient

| | | | |
|---|---|---|---|
| 1st unit: | a1 = 3.90142e+01 a4 = 7.71724e+01 a7 = −2.96624e+02 | a2 = −2.94170e+02 a5 = −8.10637e+02 | a3 = 3.85277e+02 a6 = 8.65908e+02 |
| 2nd unit: | b1 = 1.12843e+02 b4 = −2.28110e+02 b7 = −4.61425e+01 | b2 = −2.88109e+02 b5 = −6.79860e+01 | b3 = 3.68976e+02 b6 = 1.53158e+02 |
| 3rd unit: | c1 = −2.79332e+01 | | |

Numerical Example 3 f = 5.29~104.23 Fno = 2.87~5.88 2ω = 75.2°~4.3°

| | | | |
|---|---|---|---|
| R 1 = 73.270 | D 1 = 1.93 | N 1 = 1.806100 | ν 1 = 33.3 |
| R 2 = 36.134 | D 2 = 6.10 | N 2 = 1.496999 | ν 2 = 81.5 |
| R 3 = −1593.867 | D 3 = 0.10 | | |
| R 4 = 34.292 | D 4 = 4.37 | N 3 = 1.603112 | ν 3 = 60.6 |
| R 5 = 132.338 | D 5 = variable | | |
| R 6 = 52.461 | D 6 = 1.02 | N 4 = 1.882997 | ν 4 = 40.8 |
| R 7 = 8.940 | D 7 = 3.73 | | |
| R 8 = 45.883 | D 8 = 0.87 | N 5 = 1.882997 | ν 5 = 40.8 |
| R 9 = 16.672 | D 9 = 2.94 | | |
| R10 = −57.628 | D10 = 0.76 | N 6 = 1.882997 | ν 6 = 40.8 |
| R11 = 45.188 | D11 = 0.10 | | |
| R12 = 20.109 | D12 = 2.37 | N 7 = 1.922860 | ν 7 = 18.9 |
| R13 = −1004.281 | D13 = variable | | |
| R14 = stop | D14 = 1.40 | | |
| *R15 = 10.049 | D15 = 3.41 | N 8 = 1.743198 | ν 8 = 49.3 |
| R16 = 27.755 | D16 = 1.48 | | |
| R17 = 16.673 | D17 = 1.07 | N 9 = 1.806100 | ν 9 = 33.3 |
| R18 = 9.550 | D18 = 0.29 | | |
| R19 = 15.181 | D19 = 0.61 | N10 = 2.003300 | ν10 = 28.3 |
| R20 = 7.016 | D20 = 2.09 | N11 = 1.693501 | ν11 = 53.2 |

-continued f = 5.29~104.23 Fno = 2.87~5.88 2ω = 75.2°~4.3°

| | | | |
|---|---|---|---|
| R21 = −84.195 | D21 = variable | | |
| R22 = 0.000 | D22 = 0.00 | | |
| *R23 = 24.228 | D23 = 2.14 | N12 = 1.743198 | ν12 = 49.3 |
| R24 = −27.285 | D24 = 0.51 | N13 = 1.717362 | ν13 = 29.5 |
| R25 = 143.304 | D25 = variable | | |
| R26 = ∞ | D26 = 0.76 | N14 = 1.516330 | ν14 = 64.1 |
| R27 = ∞ | | | |

| | focal length | | |
|---|---|---|---|
| variable distance | 5.29 | 35.84 | 104.23 |
| D 5 | 0.80 | 29.98 | 39.17 |
| D13 | 34.11 | 4.98 | 1.88 |
| D21 | 7.58 | 10.61 | 39.65 |
| D25 | 5.70 | 15.61 | 2.40 |

Aspheric Coefficient

| | | | |
|---|---|---|---|
| 15th surface: | k = 2.80071e−02 D = 9.17201e−09 | B = −5.92226e−05 E = −4.38251e−10 | C = −5.08480e−07 |
| 23rd surface: | k = −5.28143e−01 D = −3.33911e−08 | B = −5.34071e−06 E = 4.98653e−10 | C = 8.56601e−07 |

Movement Coefficient

| | | | |
|---|---|---|---|
| 1st unit: | a1 = 3.92637e+01 a4 = 1.86116e+02 a7 = −1.72670e+02 | a2 = −2.76917e+02 a5 = −6.91619e+02 | a3 = 2.88150e+02 a6 = 5.92766e+02 |
| 2nd unit: | b1 = 1.14693e+02 b4 = 2.95562e+02 b7 = −3.93039e+02 | b2 = −3.04619e+02 b5 = −1.22929e+03 | b3 = 3.09885e+02 b6 = 1.21027e+03 |
| 3rd unit: | c1 = −2.87588e+01 | | |

Numerical Example 4 f = 5.20~103.37 Fno = 2.85~5.86 2ω = 75.2°~4.2°

| | | | |
|---|---|---|---|
| R 1 = 70.825 | D 1 = 2.00 | N 1 = 1.806100 | ν 1 = 33.3 |
| R 2 = 36.803 | D 2 = 6.31 | N 2 = 1.496999 | ν 2 = 81.5 |
| R 3 = 902.547 | D 3 = 0.10 | | |
| R 4 = 36.237 | D 4 = 4.14 | N 3 = 1.603112 | ν 3 = 60.6 |
| R 5 = 142.872 | D 5 = variable | | |
| R 6 = 55.999 | D 6 = 1.10 | N 4 = 1.882997 | ν 4 = 40.8 |
| R 7 = 10.523 | D 7 = 4.05 | | |
| R 8 = 62.759 | D 8 = 0.85 | N 5 = 1.882997 | ν 5 = 40.8 |
| R 9 = 16.044 | D 9 = 3.92 | | |
| R10 = −34.172 | D10 = 0.75 | N 6 = 1.834000 | ν 6 = 37.2 |
| R11 = 962.978 | D11 = 0.10 | | |
| R12 = 28.210 | D12 = 2.50 | N 7 = 1.922860 | ν 7 = 18.9 |
| R13 = −128.972 | D13 = variable | | |
| R14 = stop | D14 = 1.39 | | |
| *R15 = 10.372 | D15 = 3.29 | N 8 = 1.693500 | ν 8 = 53.2 |
| R16 = 60.930 | D16 = 1.84 | | |
| R17 = 17.800 | D17 = 1.05 | N 9 = 1.806100 | ν 9 = 33.3 |
| R18 = 9.712 | D18 = 0.46 | | |
| R19 = 19.071 | D19 = 0.60 | N10 = 2.003300 | ν10 = 28.3 |
| R20 = 6.991 | D20 = 2.33 | N11 = 1.743997 | ν11 = 44.8 |
| R21 = −299.426 | D21 = variable | | |
| R22 = 0.000 | D22 = 0.00 | | |
| R23 = 22.920 | D23 = 2.77 | N12 = 1.743198 | ν12 = 49.3 |
| R24 = −21.915 | D24 = 0.50 | N13 = 1.688931 | ν13 = 31.1 |
| R25 = 74.446 | D25 = variable | | |
| R26 = ∞ | D26 = 0.75 | N14 = 1.516330 | ν14 = 64.1 |
| R27 = ∞ | | | |

| | focal length | | |
|---|---|---|---|
| variable distance | 5.20 | 40.43 | 103.37 |
| D 5 | 0.80 | 34.62 | 41.01 |

-continued

| f = 5.20~103.37 Fno = 2.85~5.86 2ω = 75.2°~4.2° | | | |
|---|---|---|---|
| D13 | 42.86 | 5.99 | 1.84 |
| D21 | 8.11 | 11.67 | 40.05 |
| D25 | 5.58 | 13.76 | 1.57 |

| Aspheric Coefficient | | | |
|---|---|---|---|
| 15th surface: | k = 2.37811e−02<br>D = 1.94633e−09 | B = −6.06890e−05<br>E = −1.24818e−10 | C = −4.52717e−07 |

| Movement Coefficient | | | |
|---|---|---|---|
| 1st unit: | a1 = 9.73151e+00<br>a4 = 1.21350e+05<br>a7 = −5.88649e+05<br>a10 = 1.81882e+04 | a2 = 2.17693e+03<br>a5 = −3.32562e+05<br>a8 = 3.72712e+05 | a3 = −2.50665e+04<br>a6 = 5.60383e+05<br>a9 = −1.28570e+05 |
| 2nd unit: | b1 = 1.04805e+02<br>b4 = −5.46126e+03<br>b7 = 1.30014e+05<br>b10 = −1.73295e+04 | b2 = 9.43438e+00<br>b5 = 2.77398e+04<br>b8 = −1.33078e+05 | b3 = 1.12339e+02<br>b6 = −7.64446e+04<br>b9 = 7.43465e+04 |
| 3rd unit: | c1 = −2.79137e+01 | | |

Numerical Example 5

| f = 5.30~104.17 Fno = 2.87~5.87 2ω = 73.2°~4.2° | | | |
|---|---|---|---|
| R 1 = 78.887 | D 1 = 1.93 | N 1 = 1.806100 | ν 1 = 33.3 |
| R 2 = 37.025 | D 2 = 6.10 | N 2 = 1.496999 | ν 2 = 81.5 |
| R 3 = −803.488 | D 3 = 0.10 | | |
| R 4 = 34.768 | D 4 = 4.37 | N 3 = 1.603112 | ν 3 = 60.6 |
| R 5 = 134.498 | D 5 = variable | | |
| R 6 = 38.420 | D 6 = 1.02 | N 4 = 1.882997 | ν 4 = 40.8 |
| R 7 = 8.740 | D 7 = 3.73 | | |
| R 8 = 40.547 | D 8 = 0.87 | N 5 = 1.882997 | ν 5 = 40.8 |
| R 9 = 15.780 | D 9 = 2.94 | | |
| R10 = −48.391 | D10 = 0.76 | N 6 = 1.882997 | ν 6 = 40.8 |
| R11 = 46.731 | D11 = 0.10 | | |
| R12 = 20.208 | D12 = 2.37 | N 7 = 1.922860 | ν 7 = 18.9 |
| R13 = −1004.281 | D13 = variable | | |
| R14 = stop | D14 = 1.40 | | |
| *R15 = 9.986 | D15 = 3.41 | N 8 = 1.743198 | ν 8 = 49.3 |
| R16 = 22.473 | D16 = 1.48 | | |
| R17 = 16.018 | D17 = 1.07 | N 9 = 1.806100 | ν 9 = 33.3 |
| R18 = 9.799 | D18 = 0.29 | | |
| R19 = 15.025 | D19 = 0.61 | N10 = 2.003300 | ν10 = 28.3 |
| R20 = 7.263 | D20 = 2.09 | N11 = 1.693501 | ν11 = 53.2 |
| R21 = −67.883 | D21 = variable | | |
| R22 = 0.000 | D22 = 0.00 | | |
| *R23 = 24.665 | D23 = 2.14 | N12 = 1.743198 | ν12 = 49.3 |
| R24 = −18.436 | D24 = 0.51 | N13 = 1.761821 | ν13 = 26.5 |
| R25 = −163.759 | D25 = variable | | |
| R26 = −18.299 | D26 = 0.80 | N14 = 1.516330 | ν14 = 64.1 |
| R27 = −1200.669 | D27 = 1.50 | | |
| R28 = ∞ | D28 = 0.76 | N15 = 1.516330 | ν15 = 64.1 |
| R29 = ∞ | | | |

| | focal length | | |
|---|---|---|---|
| variable distance | 5.30 | 32.48 | 104.17 |
| D 5 | 0.80 | 28.45 | 40.70 |
| D13 | 33.11 | 3.54 | 1.79 |
| D21 | 6.89 | 9.74 | 36.74 |
| D25 | 6.59 | 15.90 | 3.77 |

| Aspheric Coefficient | | | |
|---|---|---|---|
| 15th surface: | k = −1.68720e−01<br>D = 1.18626e−08 | B = −3.92397e−05<br>E = −3.61328e−10 | C = −3.61583e−07 |
| 23rd surface: | k = −5.28143e−01<br>D = −3.33911e−08 | B = −5.34071e−06<br>E = 4.98653e−10 | C = 8.56601e−07 |

-continued

| f = 5.30~104.17 Fno = 2.87~5.87 2ω = 73.2°~4.2° | | | |
|---|---|---|---|

| Movement Coefficient | | | |
|---|---|---|---|
| 1st unit: | a1 = 4.89168e+01<br>a4 = 1.86424e+02<br>a7 = −1.74775e+02 | a2 = −2.84416e+02<br>a5 = −6.91238e+02 | a3 = 2.87222e+02<br>a6 = 5.92250e+02 |
| 2nd unit: | b1 = 1.16559e+02<br>b4 = 2.93278e+02<br>b7 = −3.94706e+02 | b2 = −3.06353e+02<br>b5 = −1.23029e+03 | b3 = 3.19612e+02<br>b6 = 1.20619e+03 |
| 3rd unit: | c1 = −2.70308e+01 | | |

Numerical Example 6

| f = 4.92~104.23 Fno = 2.78~5.87 2ω = 79.6°~4.3° | | | |
|---|---|---|---|
| R 1 = 74.324 | D 1 = 1.93 | N 1 = 1.806100 | ν 1 = 33.3 |
| R 2 = 36.134 | D 2 = 6.10 | N 2 = 1.496999 | ν 2 = 81.5 |
| R 3 = −1593.867 | D 3 = 0.10 | | |
| R 4 = 34.292 | D 4 = 4.37 | N 3 = 1.603112 | ν 3 = 60.6 |
| R 5 = 132.338 | D 5 = variable | | |
| R 6 = 55.422 | D 6 = 1.02 | N 4 = 1.882997 | ν 4 = 40.8 |
| R 7 = 8.940 | D 7 = 3.73 | | |
| R 8 = 45.883 | D 8 = 0.87 | N 5 = 1.882997 | ν 5 = 40.8 |
| R 9 = 16.672 | D 9 = 2.94 | | |
| R10 = −57.628 | D10 = 0.76 | N 6 = 1.882997 | ν 6 = 40.8 |
| R11 = 45.188 | D11 = 0.10 | | |
| R12 = 20.109 | D12 = 2.37 | N 7 = 1.922860 | ν 7 = 18.9 |
| R13 = −1004.281 | D13 = variable | | |
| R14 = stop | D14 = 1.40 | | |
| *R15 = 10.269 | D15 = 3.41 | N 8 = 1.743198 | ν 8 = 49.3 |
| R16 = 32.248 | D16 = 1.48 | | |
| R17 = 16.211 | D17 = 1.07 | N 9 = 1.806100 | ν 9 = 33.3 |
| R18 = 9.495 | D18 = 0.29 | | |
| R19 = 15.959 | D19 = 0.61 | N10 = 2.003300 | ν10 = 28.3 |
| R20 = 7.149 | D20 = 2.09 | N11 = 1.693501 | ν11 = 53.2 |
| R21 = −107.309 | D21 = variable | | |
| R22 = 0.000 | D22 = 0.00 | | |
| *R23 = 23.667 | D23 = 2.14 | N12 = 1.743198 | ν12 = 49.3 |
| R24 = −23.155 | D24 = 0.51 | N13 = 1.761821 | ν13 = 26.5 |
| R25 = −943.315 | D25 = variable | | |
| R26 = 200.000 | D26 = 1.20 | N14 = 1.516330 | ν14 = 64.1 |
| R27 = ∞ | D27 = 1.50 | | |
| R28 = ∞ | D28 = 0.76 | N15 = 1.516330 | ν15 = 64.1 |
| R29 = ∞ | | | |

| | focal length | | |
|---|---|---|---|
| variable distance | 4.92 | 31.07 | 104.23 |
| D 5 | 0.80 | 28.38 | 40.09 |
| D13 | 34.11 | 4.70 | 1.77 |
| D21 | 6.73 | 11.35 | 70.77 |
| D25 | 6.60 | 16.19 | 4.13 |

| Aspheric Coefficient | | | |
|---|---|---|---|
| 15th surface: | k = 2.57794e−02<br>D = 9.71222e−09 | B = −5.66906e−05<br>E = −4.12277e−10 | C = −5.37360e−07 |
| 23rd surface: | k = −5.28143e−01<br>D = −3.33911e−08 | B = −5.34071e−06<br>E = 4.98653e−10 | C = 8.56601e−07 |

| Movement Coefficient | | | |
|---|---|---|---|
| 1st unit: | a1 = 4.50356e+01<br>a4 = 1.86642e+02<br>a7 = −1.72147e+02 | a2 = −2.86732e+02<br>a5 = −6.93007e+02 | a3 = 2.88223e+02<br>a6 = 5.93320e+02 |
| 2nd unit: | b1 = 1.12517e+02<br>b4 = 2.96063e+02<br>b7 = −3.96830e+02 | b2 = −3.05978e+02<br>b5 = −1.23003e+03 | b3 = 3.12786e+02<br>b6 = 1.21223e+03 |
| 3rd unit: | c1 = −3.15699e+01 | | |

Numerical Example 7 f = 5.29~69.75  Fno = 2.87~4.38  2ω = 75.2°~6.4°

| | | | |
|---|---|---|---|
| R 1 = 73.270 | D 1 = 1.93 | N 1 = 1.806100 | ν 1 = 33.3 |
| R 2 = 36.134 | D 2 = 6.10 | N 2 = 1.496999 | ν 2 = 81.5 |
| R 3 = −1593.867 | D 3 = 0.10 | | |
| R 4 = 34.292 | D 4 = 4.37 | N 3 = 1.603112 | ν 3 = 60.6 |
| R 5 = 132.338 | D 5 = variable | | |
| R 6 = 52.461 | D 6 = 1.02 | N 4 = 1.882997 | ν 4 = 40.8 |
| R 7 = 8.940 | D 7 = 3.73 | | |
| R 8 = 45.883 | D 8 = 0.87 | N 5 = 1.882997 | ν 5 = 40.8 |
| R 9 = 16.672 | D 9 = 2.94 | | |
| R10 = −57.628 | D10 = 0.76 | N 6 = 1.882997 | ν 6 = 40.8 |
| R11 = 45.188 | D11 = 0.10 | | |
| R12 = 20.109 | D12 = 2.37 | N 7 = 1.922860 | ν 7 = 18.9 |
| R13 = −1004.281 | D13 = variable | | |
| R14 = stop | D14 = 1.40 | | |
| *R15 = 10.049 | D15 = 3.41 | N 8 = 1.743198 | ν 8 = 49.3 |
| R16 = 27.755 | D16 = 1.48 | | |
| R17 = 16.673 | D17 = 1.07 | N 9 = 1.806100 | ν 9 = 33.3 |
| R18 = 9.550 | D18 = 0.29 | | |
| R19 = 15.181 | D19 = 0.61 | N10 = 2.003300 | ν10 = 28.3 |
| R20 = 7.016 | D20 = 2.09 | N11 = 1.693501 | ν11 = 53.2 |
| R21 = −84.195 | D21 = variable | | |
| R22 = ∞ | D22 = 0.00 | | |
| *R23 = 24.228 | D23 = 2.14 | N12 = 1.743198 | ν12 = 49.3 |
| R24 = −27.285 | D24 = 0.51 | N13 = 1.717362 | ν13 = 29.5 |
| R25 = 143.304 | D25 = variable | | |
| R26 = ∞ | D26 = 0.76 | N14 = 1.516330 | ν14 = 64.1 |
| R27 = ∞ | | | |

| | focal length | | |
|---|---|---|---|
| variable distance | 5.29 | 21.42 | 69.75 |
| D 5 | 0.80 | 22.48 | 37.91 |
| D13 | 34.11 | 9.27 | 2.29 |
| D21 | 7.58 | 8.85 | 22.33 |
| D25 | 5.70 | 13.51 | 11.13 |

Aspheric Coefficient

| | | | |
|---|---|---|---|
| 15th surface: | k = 2.80071e−02  D = 9.17201e−09 | B = −5.92226e−05  E = −4.38251e−10 | C = −5.08480e−07 |
| 23rd surface: | k = −5.28143e−01  D = −3.33911e−08 | B = −5.34071e−06  E = 4.98653e−10 | C = 8.56601e−07 |

Movement Coefficient

| | | | |
|---|---|---|---|
| 1st unit: | a1 = 2.75403e+01  a4 = 4.50498e+01  a7 = −1.44231e+01 | a2 = −1.36240e+02  a5 = −1.17423e+02 | a3 = 9.94375e+01  a6 = 7.05906e+01 |
| 2nd unit: | b1 = 8.04478e+01  b4 = 7.15414e+01  b7 = −3.28304e+01 | b2 = −1.49869e+02  b5 = −2.08709e+02 | b3 = 1.06938e+02  b6 = 1.44127e+02 |
| 3rd unit: | c1 = −2.01720e+01 | | |

TABLE 1

| Conditional Expression | First Embodiment | Second Embodiment | Third Embodiment | Fourth Embodiment | Fifth Embodiment | Sixth Embodiment | Seventh Embodiment |
|---|---|---|---|---|---|---|---|
| (1) Ximg/fw | 0.28 | 0.33 | 0.29 | 1.67 | 0.44 | 0.35 | 0.29 |
| (2) Xobj/fw | 6.55 | 6.42 | 6.59 | 5.21 | 6.72 | 7.56 | 4.81 |
| (3) β2t/β2w | 5.55 | 4.67 | 5.56 | 5.30 | 5.70 | 5.81 | 4.84 |
| (4) β3t/β3w | 3.18 | 3.84 | 3.13 | 3.26 | 3.00 | 2.92 | 3.47 |
| (5) f2/f3 | −0.48 | −0.48 | −0.48 | −0.50 | −0.49 | −0.49 | −0.48 |
| (6) f1/fw | 12.19 | 12.07 | 11.93 | 12.94 | 12.23 | 12.75 | 11.93 |

According to each of the embodiments, a small zoom lens device having a small front lens diameter while having a high zoom ratio, and providing a high optical performance over an entire zooming range is provided.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-203964 filed Aug. 6, 2007, which is hereby incorporated by reference herein in its entirety.

What is claimed is:

1. A zoom lens device comprising, from an object side to an image side:

a first lens unit having a positive refractive power;
   a second lens unit having a negative refractive power;
   a third lens unit having a positive refractive power; and
   a fourth lens unit having a positive refractive power,
   wherein zooming is performed by changing distances between the lens units,
   wherein the first lens unit is moved towards the object side after being moved towards the image side during zooming from a wide-angle end to a telephoto end, so that the first lens unit is positioned closer to the object side at the telephoto end than at the wide-angle end, and
   wherein the following conditions are satisfied:

$0.1 < Ximg/fw < 2.5$, and $4.80 < Xobj/fw < 15.00$ where a distance between a position of the first lens unit at the wide-angle end and a position of the first lens unit that is maximally moved towards the image side is Ximg, a distance between the position of the first lens unit at the wide-angle end and a position of the first lens unit that is maximally moved towards the object side is Xobj, and a focal length of the zoom lens device at the wide-angle end is fw.

2. The zoom lens device according to claim 1, wherein the following conditions are satisfied:

$4.0 < \beta 2t/\beta 2w < 12.0$, and $1.5 < \beta 3t/\beta 3w < 6.0$ where lateral magnifications at the wide-angle end and the telephoto end of the second lens unit are β2w and β2t, respectively, and lateral magnifications at the wide-angle end and the telephoto end of the third lens unit are β3w and β3t, respectively.

3. The zoom lens device according to claim 1, wherein the following condition is satisfied:

$-0.65 < f2/f3 < -0.35$ where a focal length of the second lens unit is f2, and a focal length of the third lens unit is f3.

4. The zoom lens device according to claim 1, wherein the following condition is satisfied:

$$11.8 < f1/fw < 20.0$$

where a focal length of the first lens unit is f1.

5. The zoom lens device according to claim 1, wherein the first, second, third, and fourth lens units are all moved during the zooming.

6. The zoom lens device according to claim 1, wherein the second lens unit includes a first lens having a negative refractive power, a second lens having a negative refractive power, a third lens having a negative refractive power, and a fourth lens having a positive refractive power in that order from the object side to the image side, and wherein a lowest refractive index among refractive indices of materials of the respective lenses is greater than or equal to 1.8.

7. The zoom lens device according to claim 1, wherein the third lens unit includes a positive lens, a meniscus negative lens, and a cemented lens in that order from the object side to the image side, an object-side surface of the positive lens being a convex surface, an object-side surface of the negative lens being a convex surface, the cemented lens having a meniscus negative lens, whose object side has a convex shape, and a positive lens joined to each other.

8. The zoom lens device according to claim 1, further comprising a fifth lens unit disposed at the image side of the fourth lens unit and having a positive or a negative refractive power.

9. The zoom lens device according to claim 1, wherein an image is formed on a solid-state image pickup element.

10. An image pickup apparatus comprising:
a zoom lens device; and
a solid-state image pickup element configured to receive an image formed with the zoom lens device,
wherein the zoom lens device includes, from an object side to an image side:
a first lens unit having a positive refractive power;
a second lens unit having a negative refractive power;
a third lens unit having a positive refractive power; and
a fourth lens unit having a positive refractive power,
wherein zooming is performed by changing distances between the lens units,
wherein the first lens unit is moved towards the object side after being moved towards the image side during zooming from a wide-angle end to a telephoto end, so that the first lens unit is positioned closer to the object side at the telephoto end than at the wide-angle end, and
wherein the following conditions are satisfied:

$$0.1 < Ximg/fw < 2.5, \text{ and}$$

$$4.80 < Xobj/fw < 15.00$$

where a distance between a position of the first lens unit at the wide-angle end and a position of the first lens unit that is maximally moved towards the image side is Ximg, a distance between the position of the first lens unit at the wide-angle end and a position of the first lens unit that is maximally moved towards the object side is Xobj, and a focal length of the zoom lens device at the wide-angle end is fw.

* * * * *